(12) United States Patent  
Indelicato, III et al.

(10) Patent No.: US 8,674,997 B2
(45) Date of Patent: *Mar. 18, 2014

(54) SYSTEMS AND METHODS FOR RESOURCE PLANNING USING ANIMATION

(75) Inventors: Enrico Indelicato, III, North Babylon, NY (US); Christopher Frank Careri, North Babylon, NY (US)

(73) Assignee: Janik LLC, North Babylon, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,529

(22) Filed: Sep. 14, 2012

(65) Prior Publication Data

US 2013/0027409 A1    Jan. 31, 2013

Related U.S. Application Data

(63) Continuation-in-part of application No. 13/396,778, filed on Feb. 15, 2012, now Pat. No. 8,462,162.

(60) Provisional application No. 61/443,661, filed on Feb. 16, 2011.

(51) Int. Cl.
  *G06T 13/00* (2011.01)
(52) U.S. Cl.
  USPC ............................................. 345/473; 705/35
(58) Field of Classification Search
  None
  See application file for complete search history.

(56) References Cited

U.S. PATENT DOCUMENTS

| 5,553,221 A | 9/1996 | Reimer et al. |
| 5,675,746 A | 10/1997 | Marshall |
| 5,933,815 A | 8/1999 | Golden |
| 5,987,433 A | 11/1999 | Crapo |
| 6,181,334 B1 | 1/2001 | Freeman et al. |
| 6,222,540 B1 | 4/2001 | Sacerdoti |
| 6,278,991 B1 | 8/2001 | Ebert |
| 6,349,290 B1 | 2/2002 | Horowitz et al. |
| 6,493,681 B1 | 12/2002 | Tertitski et al. |
| 6,513,019 B2 | 1/2003 | Lewis |
| 6,527,556 B1 | 3/2003 | Koskinen |
| 6,729,884 B1 | 5/2004 | Kelton et al. |
| 6,859,212 B2 | 2/2005 | Kumar et al. |

(Continued)

FOREIGN PATENT DOCUMENTS

| JP | 2005266912 A | 9/2005 |
| WO | WO2009123378 | 10/2009 |

OTHER PUBLICATIONS

Xu Liu, "A Survey of Internet Visualization Tools", Spring 2005, http://www.cs.umd.edu/class/spring2005/cmsc838s/viz4all/viz4all_i.html.*

(Continued)

*Primary Examiner* — Kee M Tung
*Assistant Examiner* — Ryan D McCulley
(74) *Attorney, Agent, or Firm* — Scully, Scott, Murphy & Presser, P.C.

(57) ABSTRACT

A system and method of presenting resource information for an entity includes receiving input data associated with the resource information of the entity, generating, by a computer, an animated representation of the resource information along one or more determined timelines employing a plurality of graphical characters based on the input data and displaying the animated representation. The creation of one simple animated visual language may reduce the mass confusion typically associated with the relation of resources including financial and other concepts, saving time and money and better educating those seeking recommendations and advice regarding resource planning, including financial planning.

19 Claims, 33 Drawing Sheets

(56) References Cited

U.S. PATENT DOCUMENTS

| | | | |
|---|---|---|---|
| 6,890,179 B2 | 5/2005 | Rogan et al. | |
| 7,103,556 B2 | 9/2006 | Del Rey et al. | |
| 7,117,173 B1 | 10/2006 | Ambani | |
| 7,315,837 B2 | 1/2008 | Sloan et al. | |
| 7,370,004 B1 | 5/2008 | Patel et al. | |
| 7,383,218 B1 | 6/2008 | Oros | |
| 7,555,451 B2 | 6/2009 | Rugge et al. | |
| 7,689,494 B2 | 3/2010 | Torre et al. | |
| 7,805,344 B2 | 9/2010 | Smith | |
| 7,818,233 B1 | 10/2010 | Sloan et al. | |
| 7,880,738 B2 | 2/2011 | Abagyan et al. | |
| 7,999,810 B1 * | 8/2011 | Boice et al. | 345/473 |
| 2002/0143680 A1 | 10/2002 | Walters et al. | |
| 2003/0028466 A1 | 2/2003 | Jenson et al. | |
| 2006/0095283 A1 * | 5/2006 | Matsumoto et al. | 705/1 |
| 2006/0277132 A1 * | 12/2006 | Brooks | 705/35 |
| 2007/0005468 A1 | 1/2007 | Feller et al. | |
| 2007/0005477 A1 * | 1/2007 | McAtamney | 705/35 |
| 2007/0027736 A1 | 2/2007 | Reynolds et al. | |
| 2007/0226163 A1 * | 9/2007 | Robles | 706/50 |
| 2009/0262108 A1 | 10/2009 | Davidson et al. | |
| 2010/0161467 A1 * | 6/2010 | Ageenko et al. | 705/35 |
| 2011/0055066 A1 | 3/2011 | Themmen et al. | |
| 2011/0055115 A1 | 3/2011 | Hu et al. | |
| 2011/0231453 A1 | 9/2011 | Johnson et al. | |
| 2012/0047421 A1 | 2/2012 | Holman | |

OTHER PUBLICATIONS

Jeff Reifman, "Visualize Microsoft's Tax Dodge within Washington State Deficit Bubble Graph", Nov. 2009, http://blog.reifman.org/2009/11/visualize-microsofts-tax-dodge-within-washington-state-deficit-bubble-graph.html.*

Lei et al., A Visual Analytics System for Financial Time-Series Data, Proceedings of the 3rd International Symposium on Visual Information Communication ACM, 2010, New York, NY, USA ISBN: 978-1-4503-0436-8doi>10.1145/1865841.1865868.

International Search Report together with the Written Opinion dated Jun. 6, 2013 received in related application PCT/US 2012/056808.

* cited by examiner

CiFiCo QUESTIONAIRE

To create a unique and customized movie for Joe Smith, he enters some basic information...

| Prior Generation (Mom & Dad) | Focus Generation (Joe Smith) | Next Generation (Kids) | Lower Generation (Grandchildren) |

+ TIMELINE
Name:     Joe Smith
Age:      30
End Age:  100

+ DEBT
Amount:   $12,000
Rate:     10%
Annual:   $1,000

+ INCOME
Annual:    $100,000 net
Duration:  To Age 65

+ WEF ATTACK
Type:    LAWSUIT ATTACK
Amount:  $200,000
Age:     45

+ NEST EGG
IRA:          $50,000 net
Annual:       $5,000
Beneficiary:  Lower Generation

+ WEF DEFENSE
Type:    LIABILITY INSURANCE
Amount:  $100,000

+ REAL ESTATE
Market Value:     $300,000
Growth Rate:      4%
Annual Mortgage:  $30,0000
Equity:           $50,0000
Term:             30
Beneficiary:      Lower Generation

+ LIFE INSURANCE
Policy Type:    Whole Life
Source:         Illustration Sync
Death Benefit:  $500,000
Cash Value:     $50,000
Trust:          ILIT
Beneficiary:    Lower Generation This is an example of a fact finder.

FIG. 10

...through the use of *Visualized Financial Storytelling*, powered by CiFiCo, Joe Smith and his family will have the following events cinematized:

1. Joe paying the mortgage on his primary real estate; his home value and equity growing.
2. Joe paying his life insurance premiums; his cash value and death benefit growing.
3. Joe contributing to his nest egg containing his IRA and Cash Account; his values growing.
4. Joe paying down his debt.
5. Joe being attacked by a wealth eroding factor, in this case a lawsuit.
6. Joe's liability insurance reducing the lawsuit *WEF (Wealth Eroding Factor)* attack.
7. Joe's parents (Prior Generation) passing away and leaving inheritance to Joe.
8. Joe entering retirement and using his Nest Egg for retirement income.
9. Joe passing away, and leaving his assets to his kids (Next Generation).
10. Joe's final taxes on asset transfers being paid and the net inheritance passing to his kids (Next Generation).

We will now communicate all of these financial concepts in one brief *CiFiCo* movie.

FIG. 11

SYSTEMS AND METHODS FOR RESOURCE PLANNING USING ANIMATION

CROSS-REFERENCE TO RELATED APPLICATIONS

This application is a continuation-in-part of U.S. patent application Ser. No. 13/396,778 filed Feb. 15, 2012, which claims the benefit of U.S. Provisional Patent Application No. 61/443,661, filed Feb. 16, 2011. The entire disclosures of those applications are incorporated by reference herein.

BACKGROUND OF THE INVENTION

The technical field of this invention is resource planning, such as financial planning, materials planning, etc., using animation.

On any given day, there are millions of business meetings and presentations, most of which involve the movement of money. Party A is trying to communicate, teach or sell some financial idea to party B. The traditional methods of communicating this information are through the use of pie charts, diagrams, spreadsheets and other motionless data.

There are an infinite number of non-animated methods to present financial and material usage concepts, most of them being static charts and graphs. This causes apathy, confusion, and wastes time and money.

In partnership with Survey Monkey, the inventors polled 500 members of the U.S. population, in an effort to gauge the need for animated financial software to assist with understanding financial concepts. After seeing a demonstration of this invention, the survey participants were asked a series of questions. There was no incentive for completing the survey. The following data was extracted from the study:

- 1 out of every 2 members of the general public said they find it difficult to understand financial concepts.
- 99% of the general public stated that animated financial software would simplify the communication of financial concepts and strategies.

Having verified the need and market for this invention, the inventors, who are financial planners and have worked in the field for over a decade, developed software that provides a dynamic, personalized, and non-static method with which to better educate and advise individuals and businesses with regard to financial concepts. The software is called "CiFiCo," or "Cinematic Financial Concepts."

SUMMARY OF THE INVENTION

Through the creation of one simple animated visual language, CiFiCo will reduce the mass confusion typically associated with the relation of financial and other concepts, saving time and money and better educating those seeking recommendations and advice regarding resource planning, including financial planning.

When loaded onto any computer, the CiFiCo software takes dull, complex information and "cinematizes" it into fun, simple, engaging, moving visual representations (aka "movies") accompanied by sound and touch control. The user has complete control over every aspect of this virtual world.

After the user answers a brief series of questions, CiFiCo instantly generates an animated representation (movie) of his or her financial world. Movies contain various assets, and other information relating to the resources including incomes, and insurance, as well as intergenerational timelines. These concepts are illustrated with the use of a defined and user-friendly set of abstract characters, as seen in the incorporated drawings. This enables a particular concept or a variety of concepts to be quickly and clearly communicated to the user.

In one embodiment, CiFiCo can demonstrate the impact of asset accumulation, distribution, taxes, insurance, investments, intergenerational transfers, and countless other concepts. The tool allows individuals to gain a unique perspective on how the financial decisions they make (past, present and future) can impact their overall financial picture (movie).

In addition, the tool can demonstrate the impact of materials usage, such as factory output based on the materials available, energy consumption based on various factors, etc. An entity, such as an individual, a manufacturing facility, an energy resource, can view its relevant information in an animated fashion. In this regard, graphical characters used in the animation would represent items relevant to the particular application, e.g., factory output, energy consumption, and others.

A method of presenting resource information for an entity comprises receiving input data associated with the resource information of the entity, generating, by a computer, an animated representation of the resource information along one or more determined timelines employing a plurality of graphical characters based on the input data and displaying the animated representation. A system of presenting resource information of an entity comprises a processor and a module operable to execute on the processor and further operable to receive input data associated with the resource information of the entity, the module further operable to generate an animated representation of the resource information along one or more determined timelines employing a plurality of graphical characters based on the input data, the module further operable to display the animated representation.

In one aspect, the generating comprises generating moving images of the plurality of graphical characters changing to represent changes in the entity's financial information. In one aspect, the graphical characters represent assets and liabilities, and the graphical characters changing comprises the graphical characters expanding, contracting, exploding, melting into one another, dividing, changing texture, changing permeability, or changing color, or combinations thereof, to represent changes in the assets and liabilities over time. In one aspect, the one or more timelines comprises a timeline that represents the entity's lifespan. In one aspect, the one or more timelines further comprises a generational timeline representing a lifespan of earlier or later generation to the entity's lifespan. In one aspect, the graphical characters further comprise a meridian line that travels through the center of the graphical characters that represent assets, and wherein the meridian line together with the graphical characters that represent assets move along the timeline to represent passage of time. In one aspect, the graphical characters further comprise a barrier membrane that represents how well protected the graphical characters that represent assets are from a wealth eroding factor attack, a level of protection represented graphically by a degree of thickness of the barrier membrane. In one aspect, the graphical characters further comprise a visual membrane representing tax that the graphical characters that represent assets pass through at a specified time. In one aspect, the graphical characters further comprise a traveling membrane that appears or disappears according to its defensive quality to wealth eroding factor attack. In one aspect, the graphical characters further comprise an income river and a feeder tube connecting the income river to the graphical characters that represent assets, to animate income flow. In one aspect, the graphical characters further comprise a character representing a wealth eroding factor, the character representing the wealth eroding factor animated to attack the graphical characters that represent assets. In one aspect, the graphical characters further comprise a drain tube connecting the character representing the wealth eroding factor and one or more of the graphical characters that represent assets, to animate draining of an asset. In one aspect, the graphical characters that represent assets further contain sub-characters to represent different types of assets. In one aspect, the graphical characters that represent assets further contain a visual representation associated with secondary value of a corresponding asset. In one aspect, the graphical characters further comprise visual tax bubble characters that represent taxes and visual money bubble characters that represent sum of money. In one aspect, the graphical characters further comprise one or more pools that represent respective one or more sums of values. In one aspect, the method further comprises providing a movie control panel to enable controlling the displaying of the animated representation, including pausing, rewinding, fast-forwarding, zooming-in and zooming-out. In one aspect, the animated representation demonstrates an impact associated with asset accumulation, distribution, taxes, insurance, investments, or intergenerational transfers, or combinations there over a specified period of time.

CiFiCo can illustrate and factor for contributions and distributions, as well as risks or attacks that may draw against someone's financial stability (e.g. death, disabilities, long term care costs, lawsuits, natural disasters, market volatility, etc.). In one aspect, the application can illustrate a single financial concept, compare several financial strategies, or portray a fully integrated, multi-generational, financial plan. In one aspect, any financial concept, philosophy, or strategy can be communicated using CiFiCo—creating instant understanding for even the most non-finance oriented individuals.

A computer readable storage medium storing a program of instructions executable by a machine to perform one or more methods described herein also may be provided.

BRIEF DESCRIPTION OF THE DRAWINGS

FIGS. 10-33 are example screen shots of a sample animation in one embodiment of the present invention.

DETAILED DESCRIPTION OF THE INVENTION

Figure 1:
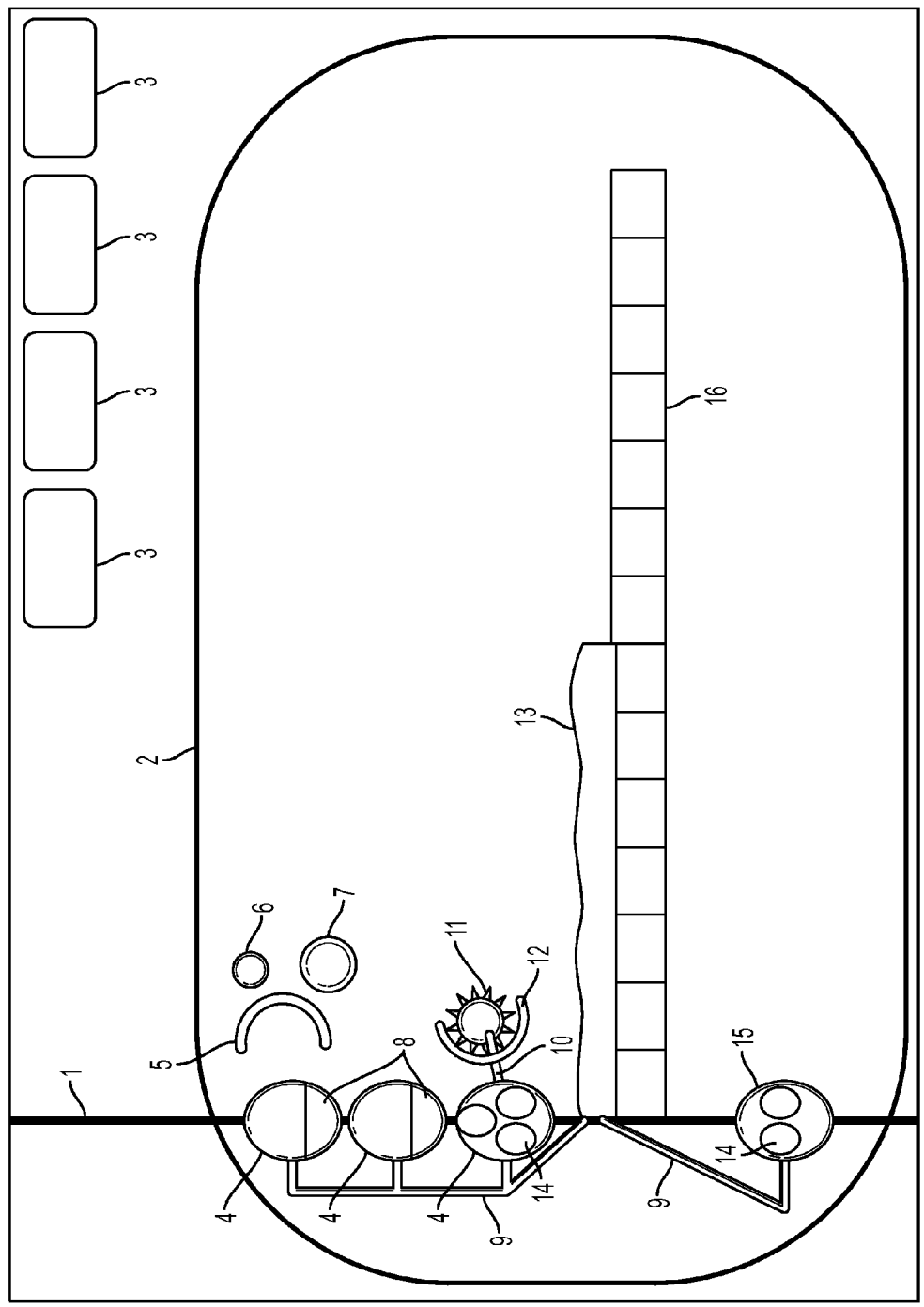
FIG. 1 illustrates a set of abstract characters and graphics used to animate CiFiCo's movies.
Figure 2:
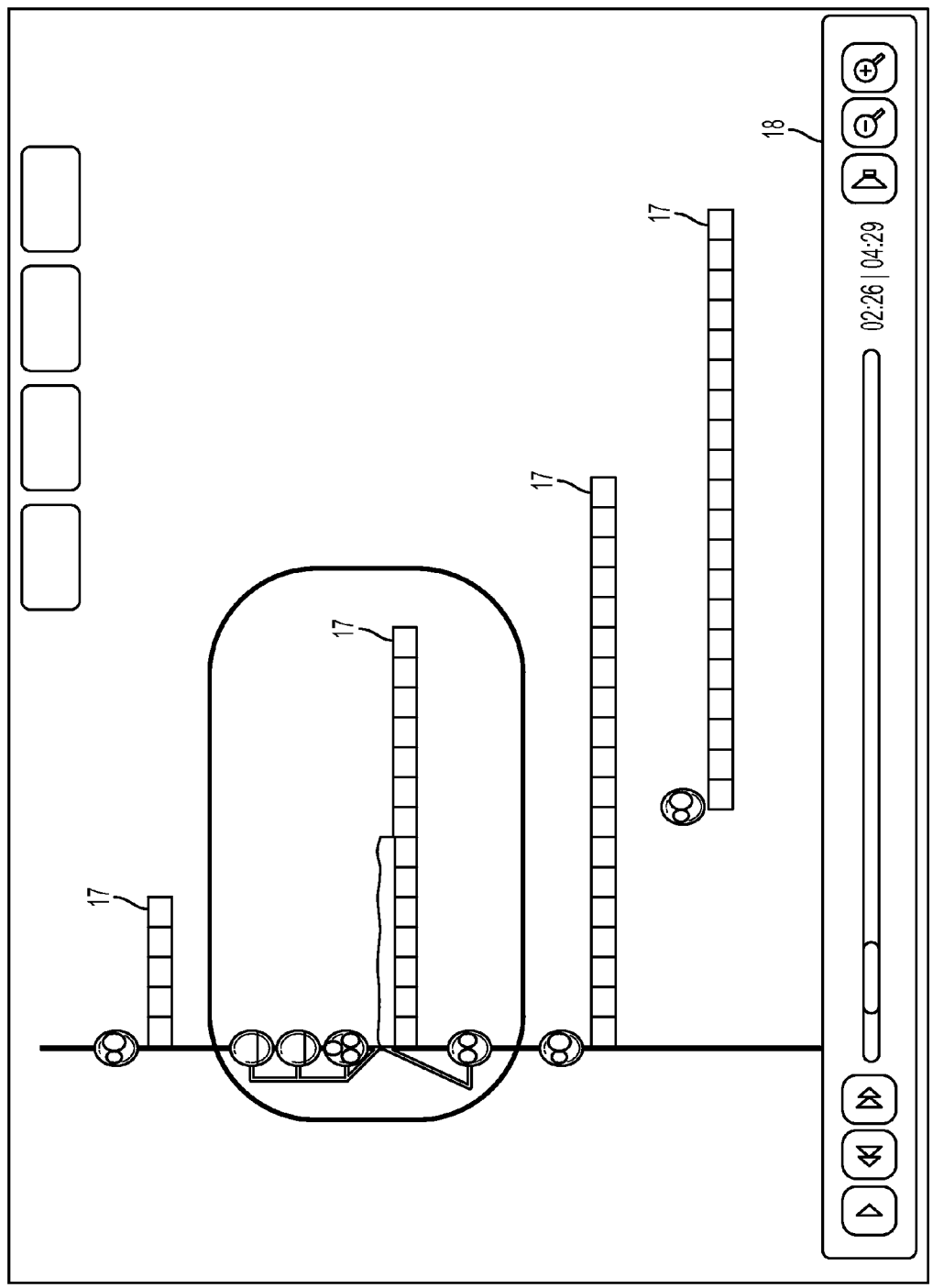
FIG. 2 illustrates another set of abstract characters and graphics used to animate CiFiCo's movies.

FIG. 1 and FIG. 2 illustrate a set of abstract characters and graphics used to animate CiFiCo's movies. The numbers in the figures are used to indicate specific characters used in the software, as follows:

Item 1 shows Meridian—A line that travels through the center of all Asset Tanks (see below) during movie playback. These lines help users identify the current place in time on a specific timeline.

Item 2 shows Wealth Protection Membrane—An entity and barrier (e.g. giant "force field"), that represents how well protected an Asset Tank is from potential risks, WEF (Wealth Eroding Factor) attacks or financial downturn. If an entity has little protection it is represented as a thin, barely visible line; an entity with maximum protection would see a thick, glowing, healthy line surrounding their Asset Tanks and Timeline.

Item 3 shows Pool—A visual representation of the sums of ongoing values as a movie plays—pools get larger or smaller as their calculated values change. Pools can be customized, (e.g. Tax bubbles flow to "tax pools," WEFs flow towards WEF pools, lifestyle spending flows to "lifestyle pools," and the value of money distributed to others, flows to "legacy pools."

Item 4 shows Assets Tanks—Orbs filled with resources, such as money, materials, etc., that represent one or more accounts or assets, for example: financial elements such as nest egg, real estate, life insurance, business interests, physical elements, such as raw materials, products, etc. These orbs are able to expand, contract, explode, melt into each other, divide into any fraction, as well as change in texture/permeability and color.

Item 5 shows Tax Membrane—Visual entities that Asset Tanks and Money Bubbles pass through at specified times during a movie's playback. This membrane shrinks Asset Tanks and Money Bubbles according to tax implications set by the user. The overall severity of this membrane is linked to its thickness, length, and color.

Item 6 shows Tax Bubble—A visual representation of taxes or other encumbrances directed towards a tax pool. These entities are directly related to a specific account and a Tax Membrane.

Item 7 shows Money Bubble—A visual representation of the sum of money or other resources moving to beneficiaries, Income Rivers, Asset Tanks, pools, etc.

Item 8 shows Secondary Values—A visual representation of the sum of a secondary value, for example, a home with mortgage may have a market value and an equity value (equity value being the secondary value), a life insurance policy may have a death benefit value and a cash value (cash value being the secondary value.

Item 9 shows Feeders—Tubes that connect and pump money from a specific timeline into a respective Asset Tank. These tubes can appear or disappear from the timeline. The value of the money passing through the feeder is displayed.

Item 10 shows Drainers—Visually similar to "Feeders," these "tubes" work in the opposite direction—sucking money from a respective Asset Tank. They are often connected to a specific WEF. The value of the money passing through the drainer is displayed.

Item 11 shows WEFs—Evil looking and acting entities that attack assets at the user's discretion, and drain them of their wealth. Based on the user's selections, WEFs can also attack income, contribution, and distribution streams.

Item 12 shows Traveling Wealth Protection Membrane—A visual entity and barrier that appears in front of an Asset Tank as it encounters a WEF. This membrane only appears if a WEF-specific defense has been designated and it will shrink or disappear according to its defensive qualities (e.g. a 100 k liability policy will disappear if it blocks a 100 k lawsuit.).

Item 13 shows Income River—This entity acts like a controlled river of money or other resources, which is directly related to an entity's income. The Income River animates the resource or cash flow or income.

Item 14 shows Sub Tanks—Orbs filled with money that are contained within asset tanks. These can be used to separate different assets within asset tanks.

Item 15 shows Debt Tank—Orbs filled with money that represent one or more items of debt.

Item 16 shows Primary Timeline—The timeline that is primarily being used or focused on.

Item 17 shows Secondary Timelines—The timelines that represent alternate entities lifespan or other resource lifecycles. In one aspect, timeline can show the lifespan of one's parents, children or grandchildren, and can be referred to as generational timelines.

Item 18 shows Movie Control Panel—A series of buttons on the movie screen that give the user the control to pause, rewind, fast-forward, zoom-in, zoom-out and experience the movie in many ways.

Generally, a user can input certain required data and then animated movies can be generated from that data. This data input can take the form of manually typing in data by a user, obtaining data from a computer or computer medium, using bar code scanning technology, using one or more of OCR (optical character recognition), voice recognition, image scanning, and/or any other available data entry techniques.

After the user answers a brief series of fact finding questions the CiFiCo application will instantly generate an animated representation (movie) of the financial world. Movies will contain various assets, incomes, and insurance, as well as intergenerational timelines. This will allow the user to quickly and clearly communicate a particular concept or a variety of concepts. The user will be able to demonstrate the impact of asset accumulation, distribution, taxes, insurance, investments, intergenerational transfers, and countless other concepts. The tool will allow individuals to get a unique perspective on how financial decisions they make (both in the present and future) can impact their overall financial picture (movie). CiFiCo can illustrate and factor for contributions and distributions, as well as "attacks" that may draw against someone's financial stability (e.g. death, disabilities, long term care costs, lawsuits, natural disaster, market volatility, etc.). The application can illustrate a single financial concept, compare several financial strategies, or portray a fully integrated, multi-generational, financial plan. Any financial concept, philosophy, or strategy can be communicated using CiFiCo.

FIGS. 10-33 are example screen shots showing a sample animation in one embodiment of the present disclosure. The animation in one embodiment is rendered as 3-dimensional (3-D) visualization with 3-D graphical characters or elements.

FIG. 10, which is an exemplary screen in which a user can enter basic information regarding his or her resources, shows user input in the exemplary embodiment of financial planning. FIG. 11 shows a summary of the information entered by the user ("Joe Smith") and the events that the inventive system will animate or "cinematize".

Figure 12:
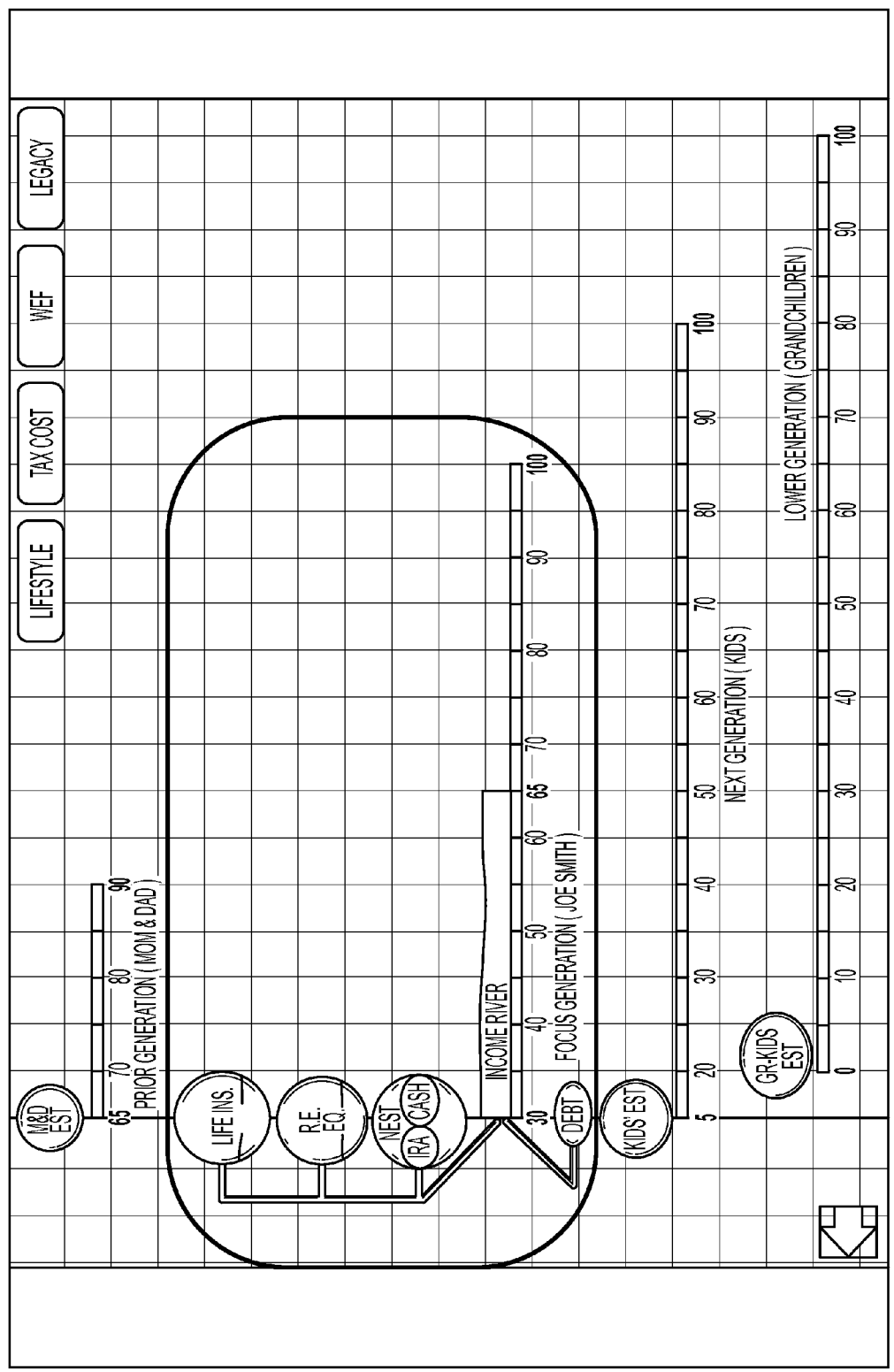
Figure 13:
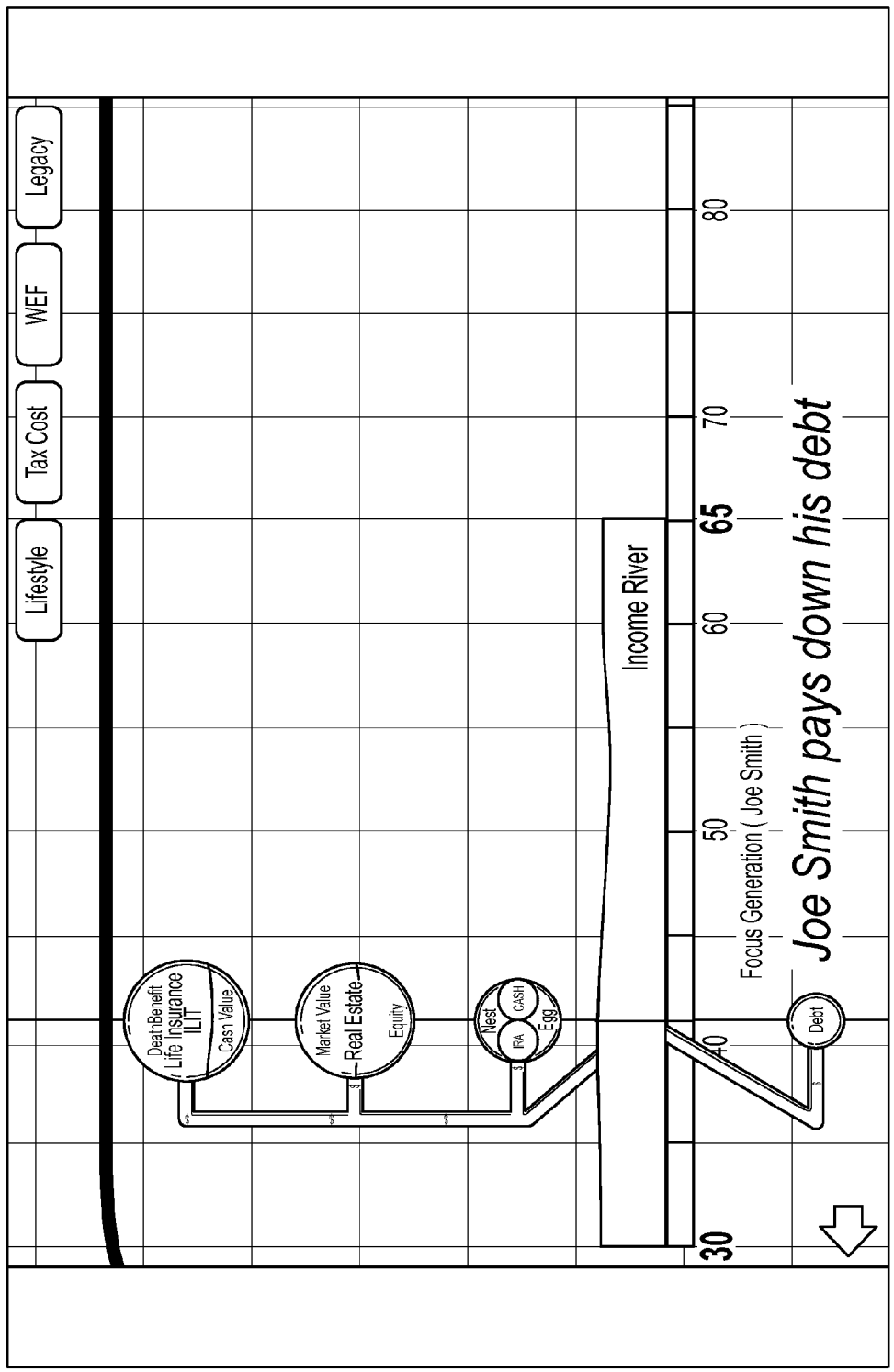

FIG. 12 shows an overview of the user's information such as the Asset Tanks of Life Insurance, Real Estate, IRA, the Money Bubble of Debt, and the Income River (projected income stream), as well as prior generation (Mom & Dad's Estate), and next generation (Kids' Estate, Grandchildren's Estate). FIG. 13 shows the event of user paying down his debt (see item 4 in FIG. 11).

Figure 14:
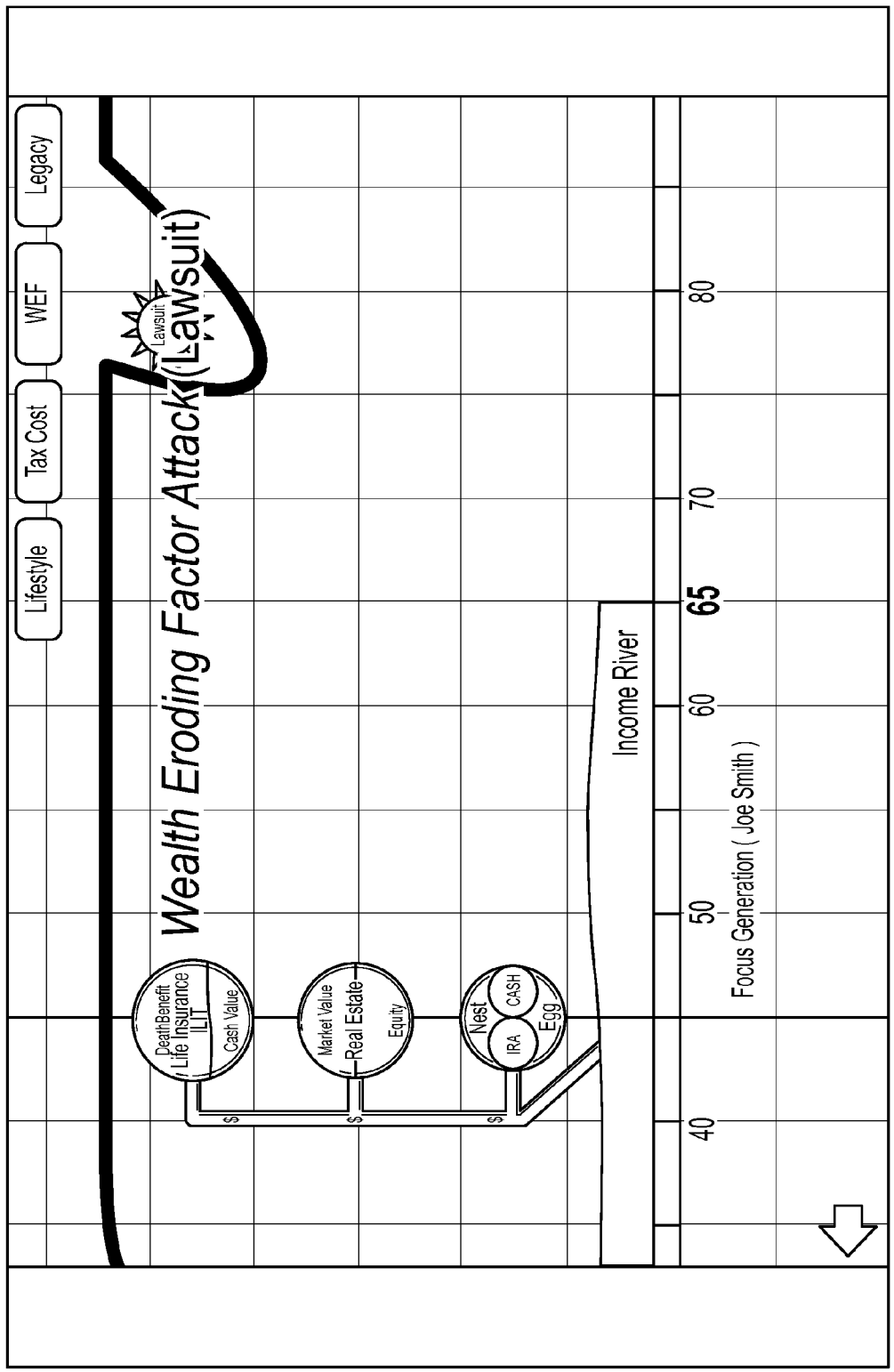
Figure 15:
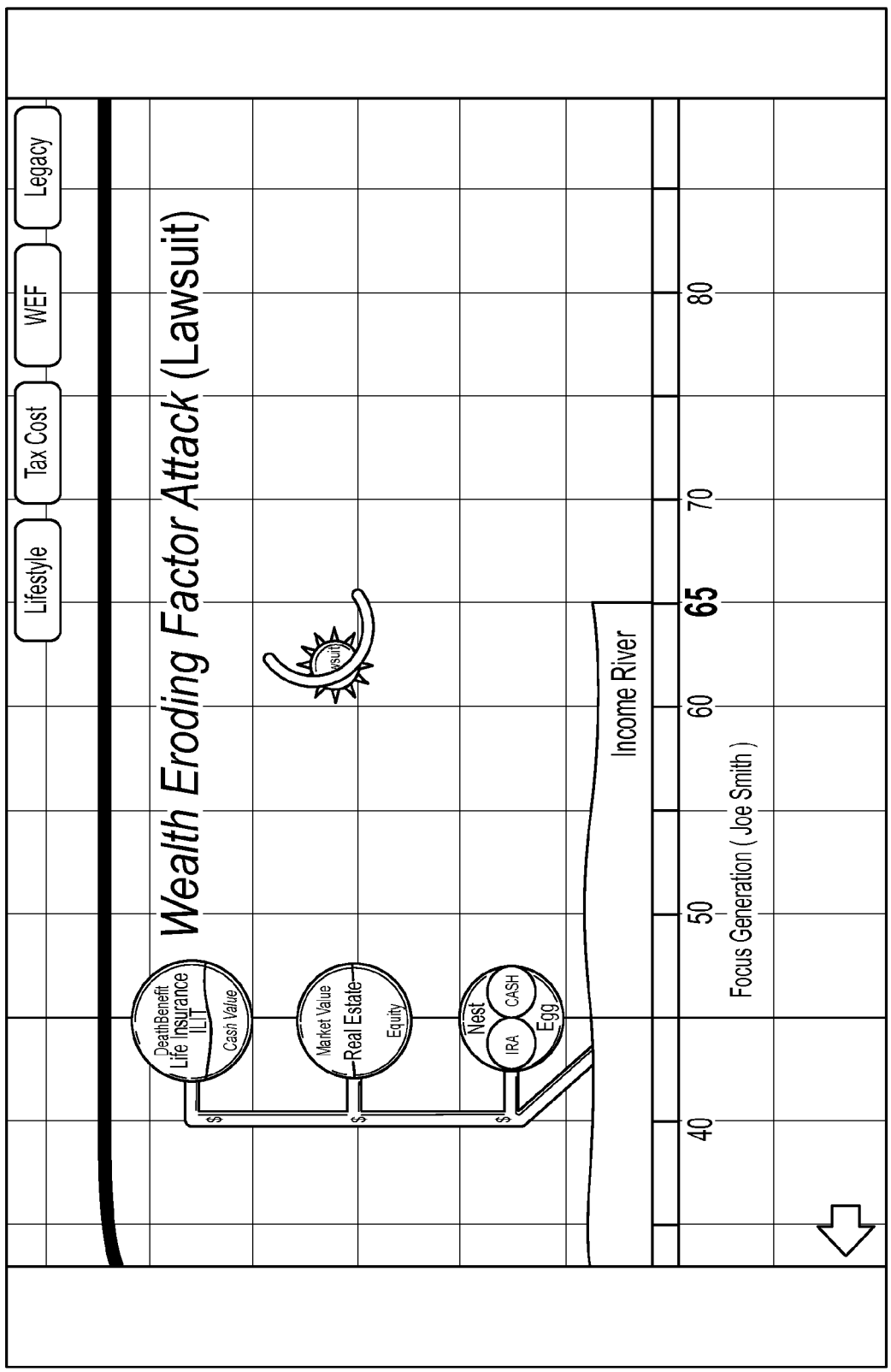
Figure 16:
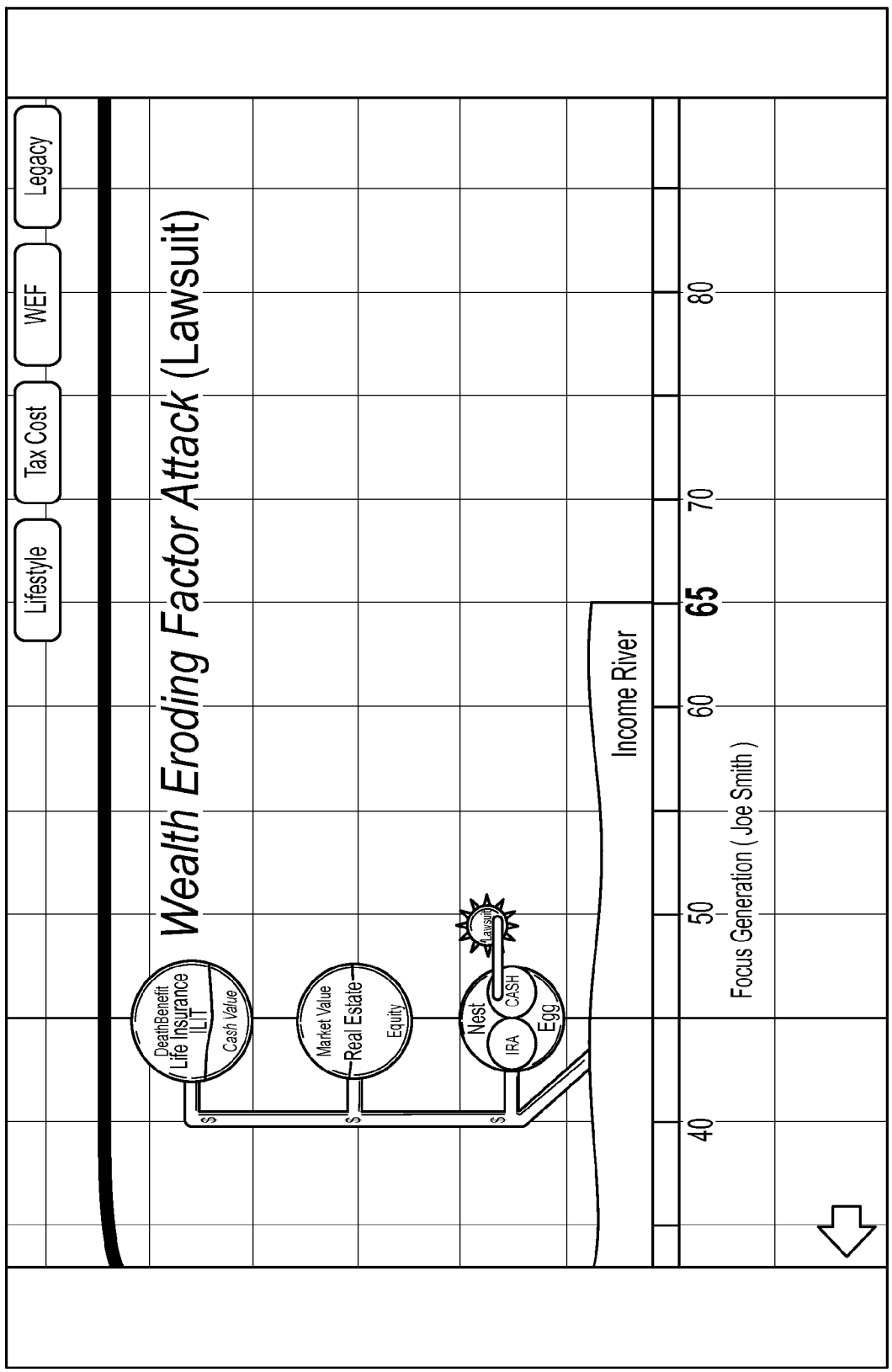
Figure 17:
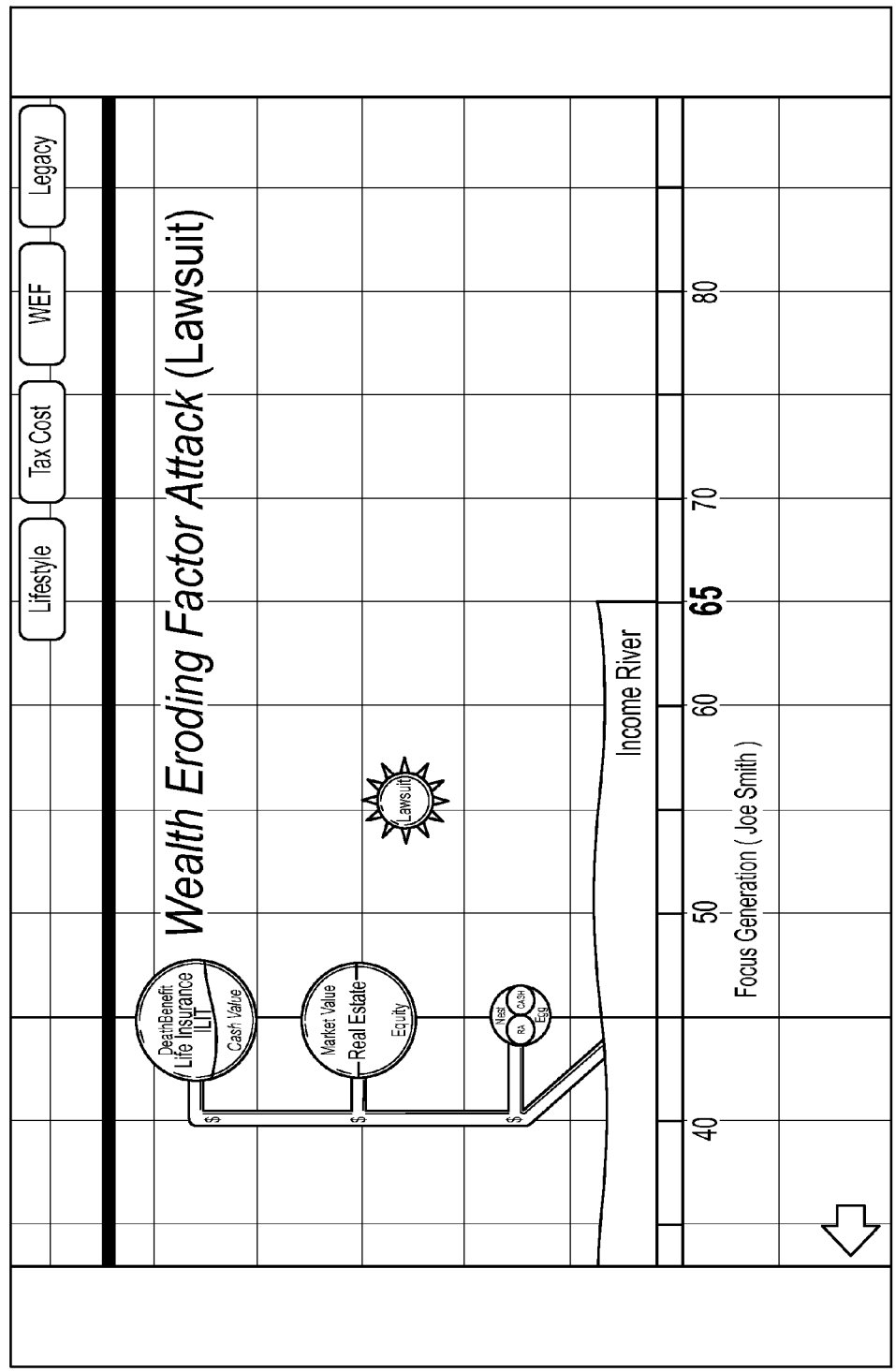
Figure 18:
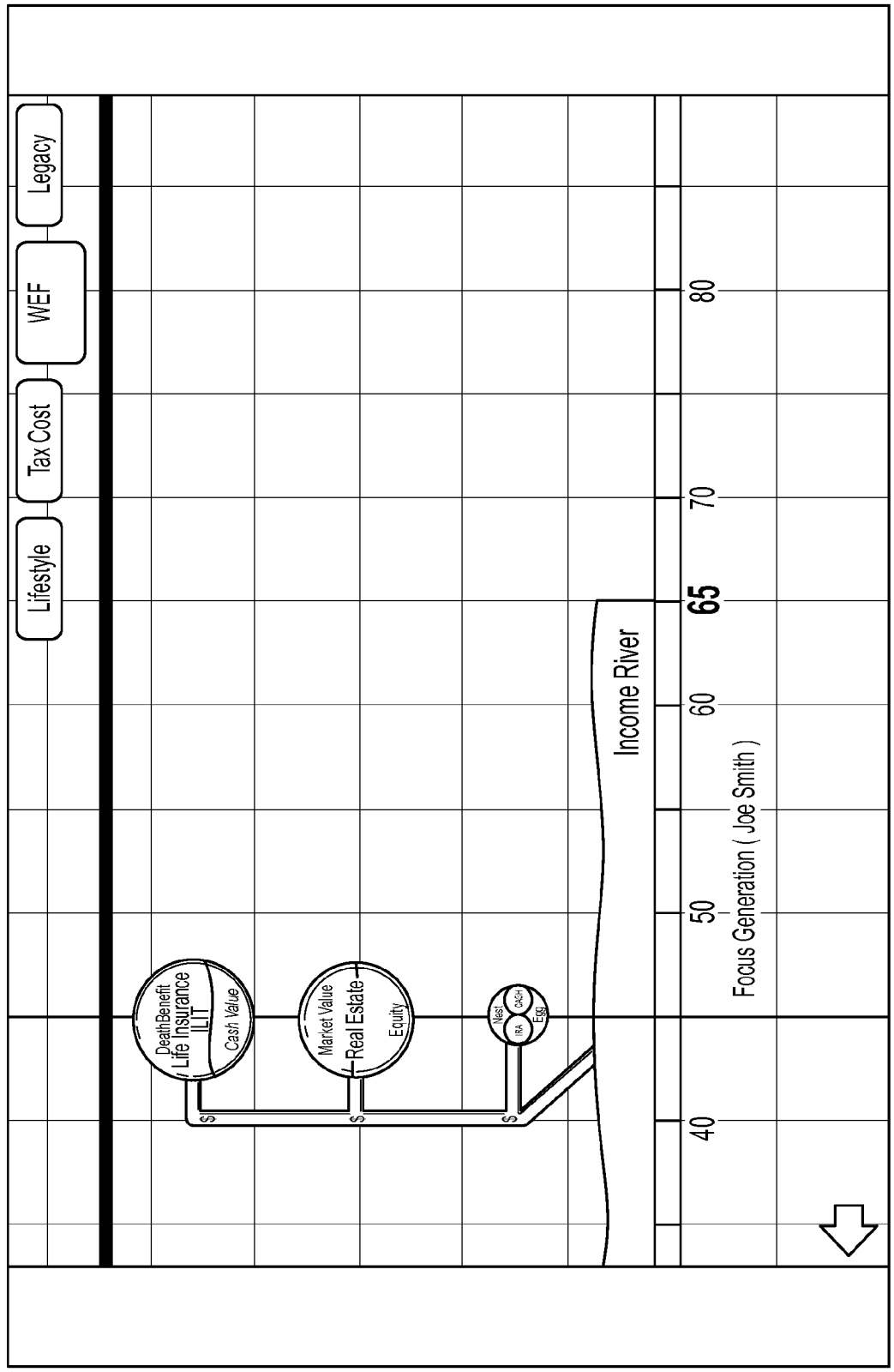

FIG. 14 shows the event of the user being attacked by a WEF (see item 5 in FIG. 11); specifically a Wealth Eroding Factor Attack of a Lawsuit is illustrated. FIG. 15 shows the event of the user's liability insurance reduces the lawsuit (see item 6 in FIG. 11). Specifically, FIG. 15 shows WEF being intercepted by a Traveling Wealth Protection Membrane. FIG. 16 shows the user's cash impacted by the lawsuit. FIG. 17 shows the impact of the lawsuit on the user's Nest Egg asset, and FIG. 18 shows that the lawsuit has been removed.

Figure 19:
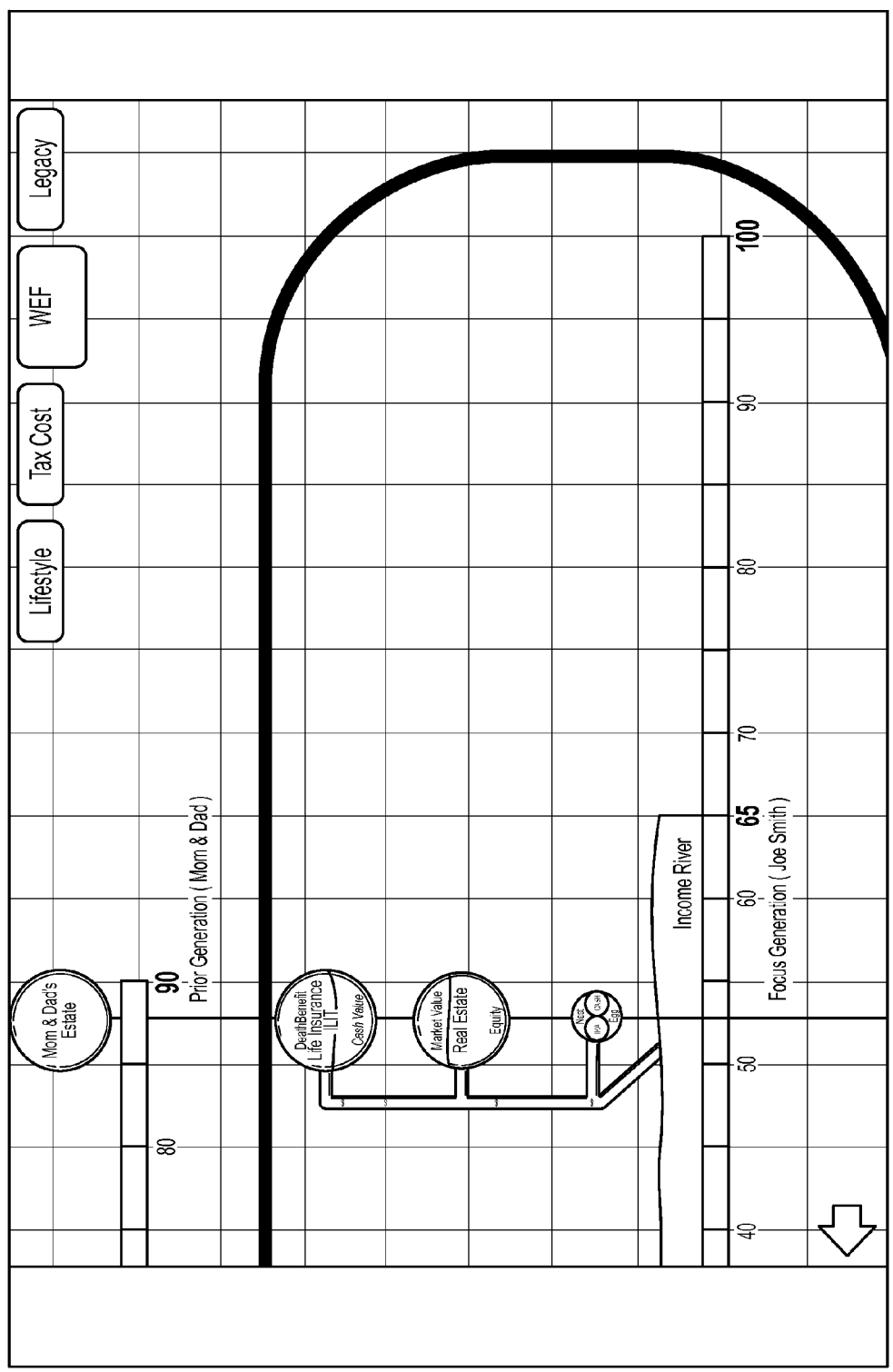
Figure 20:
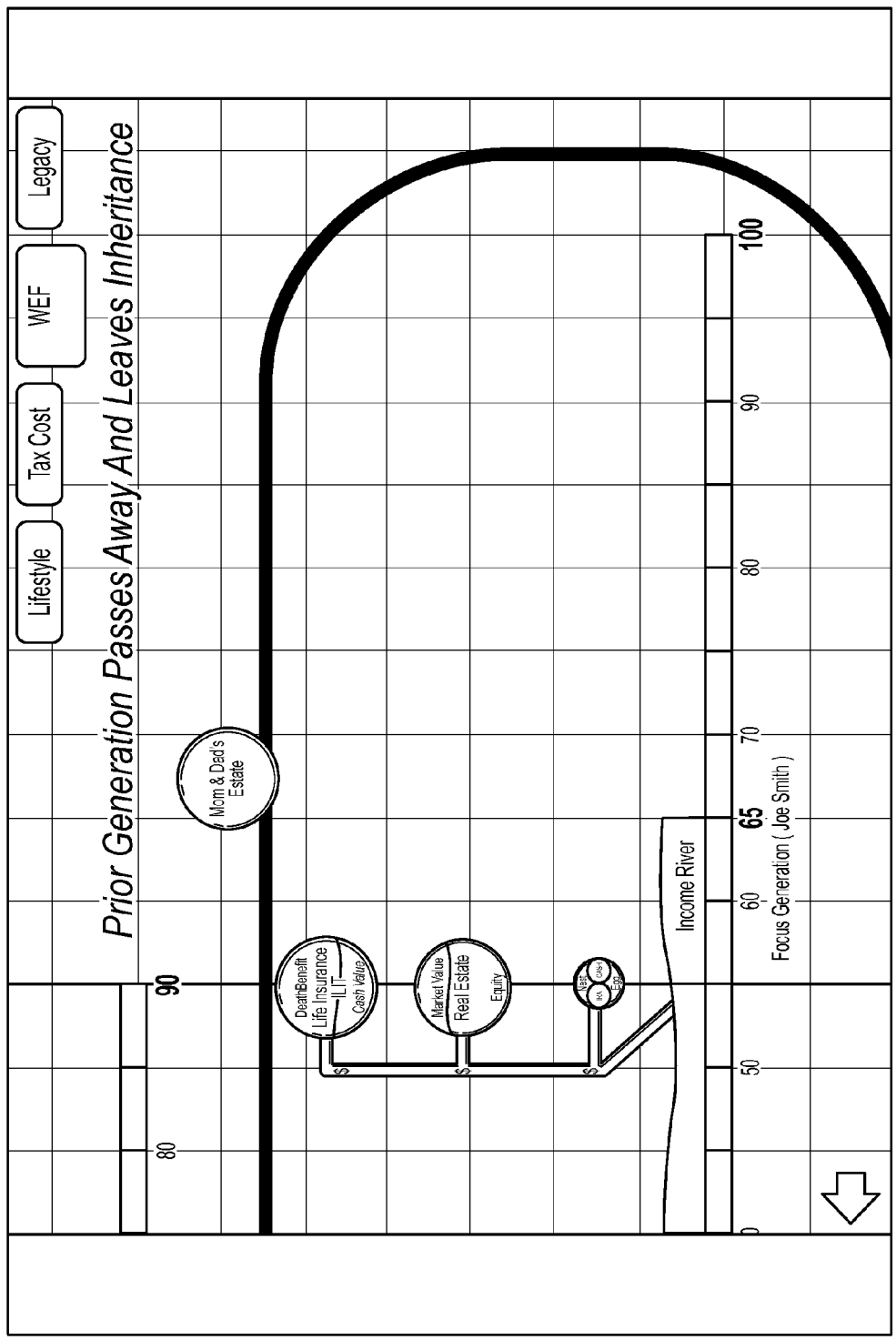
Figure 21:
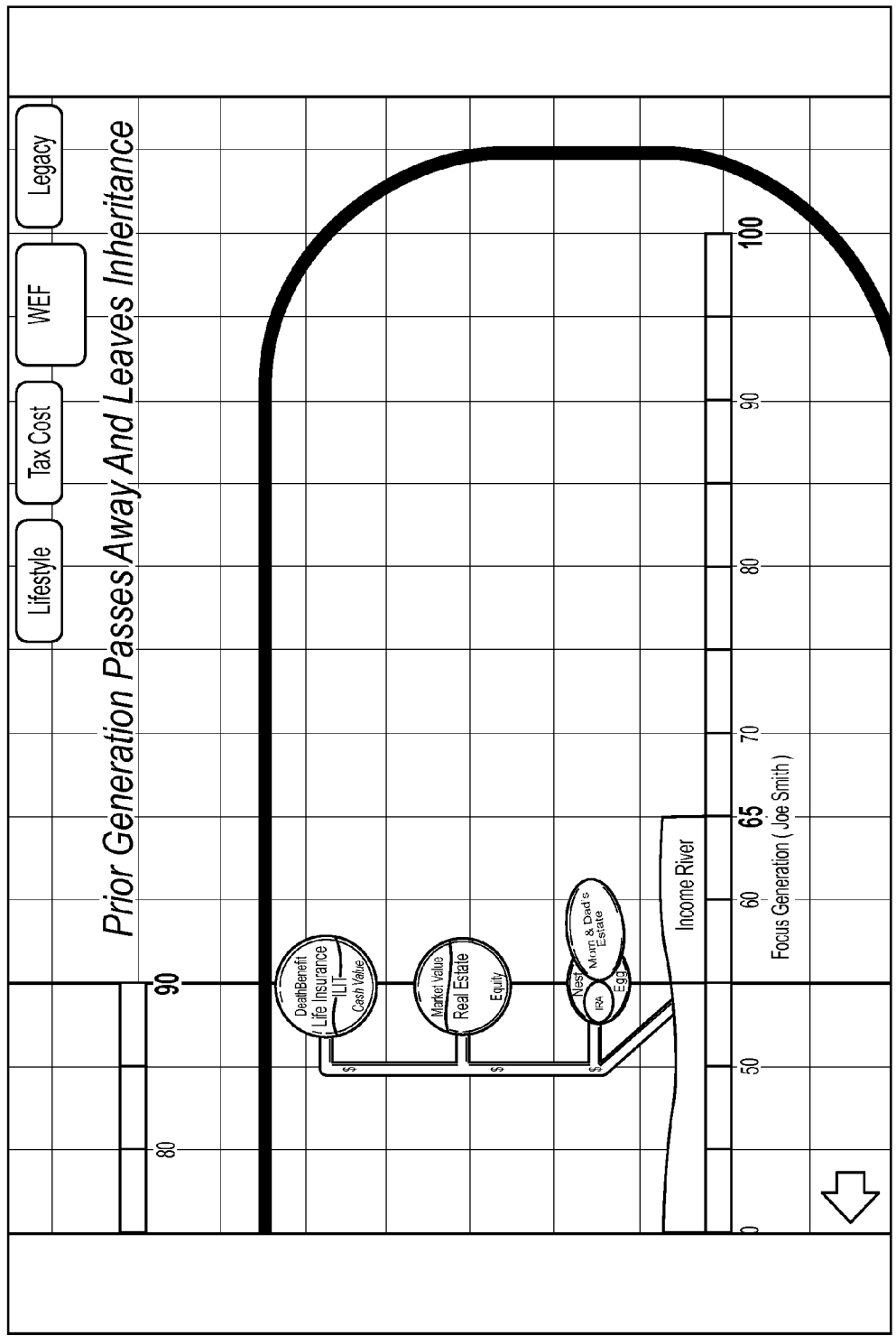

FIGS. 19-21 show the event of the Prior Generation passing away and leaving the user an inheritance (see item 7 of FIG. 11). In FIG. 19, the relationship between the Focus Generation (user) and the Prior Generation (Mom & Dad's Estate) is shown. In FIG. 20, the movement of Mom & Dad's Estate from the Prior Generation is shown. In FIG. 21, the addition of Mom &Dad's Estate to the user's Nest Egg is shown.

Figure 22:
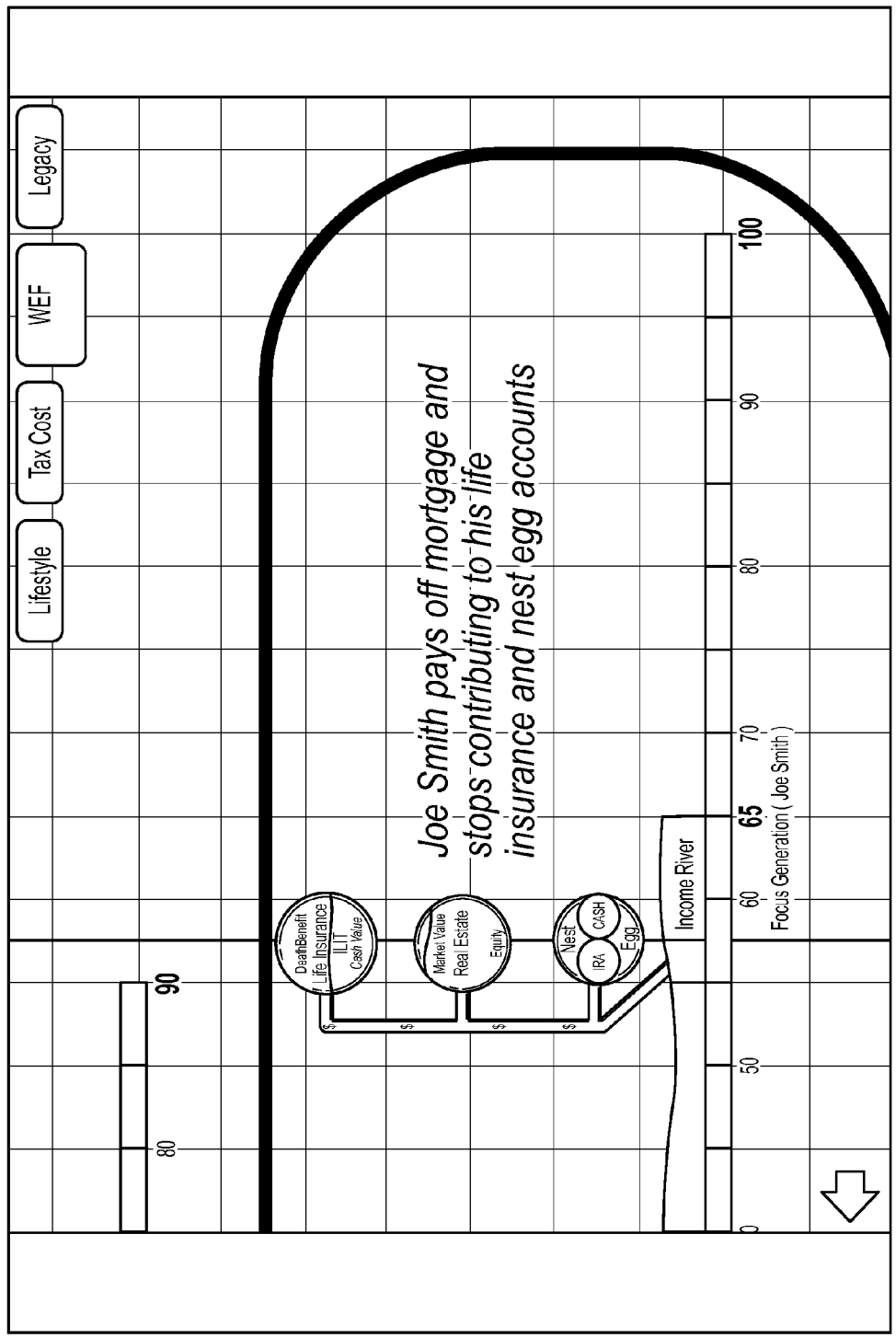
Figure 23:
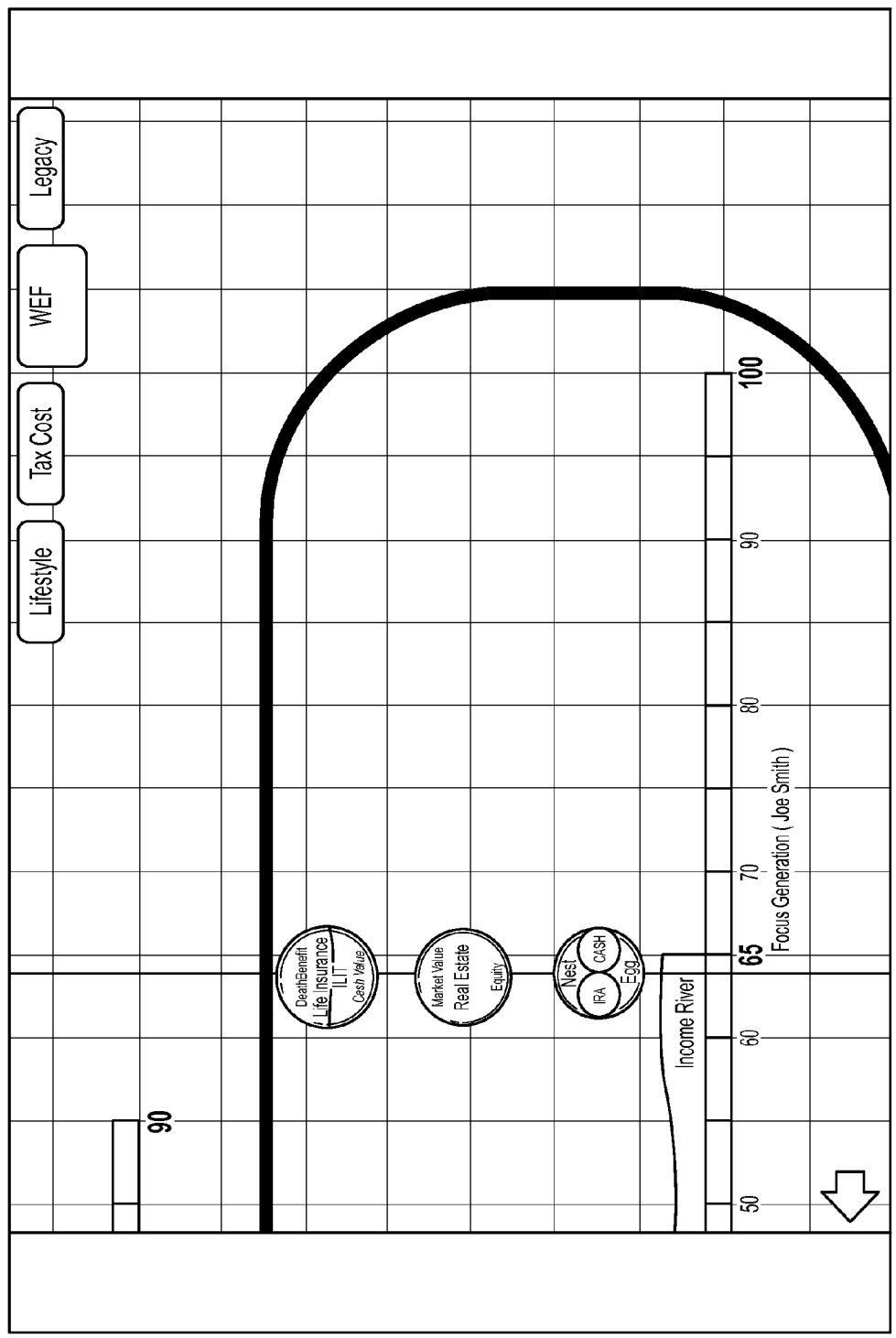
Figure 24:
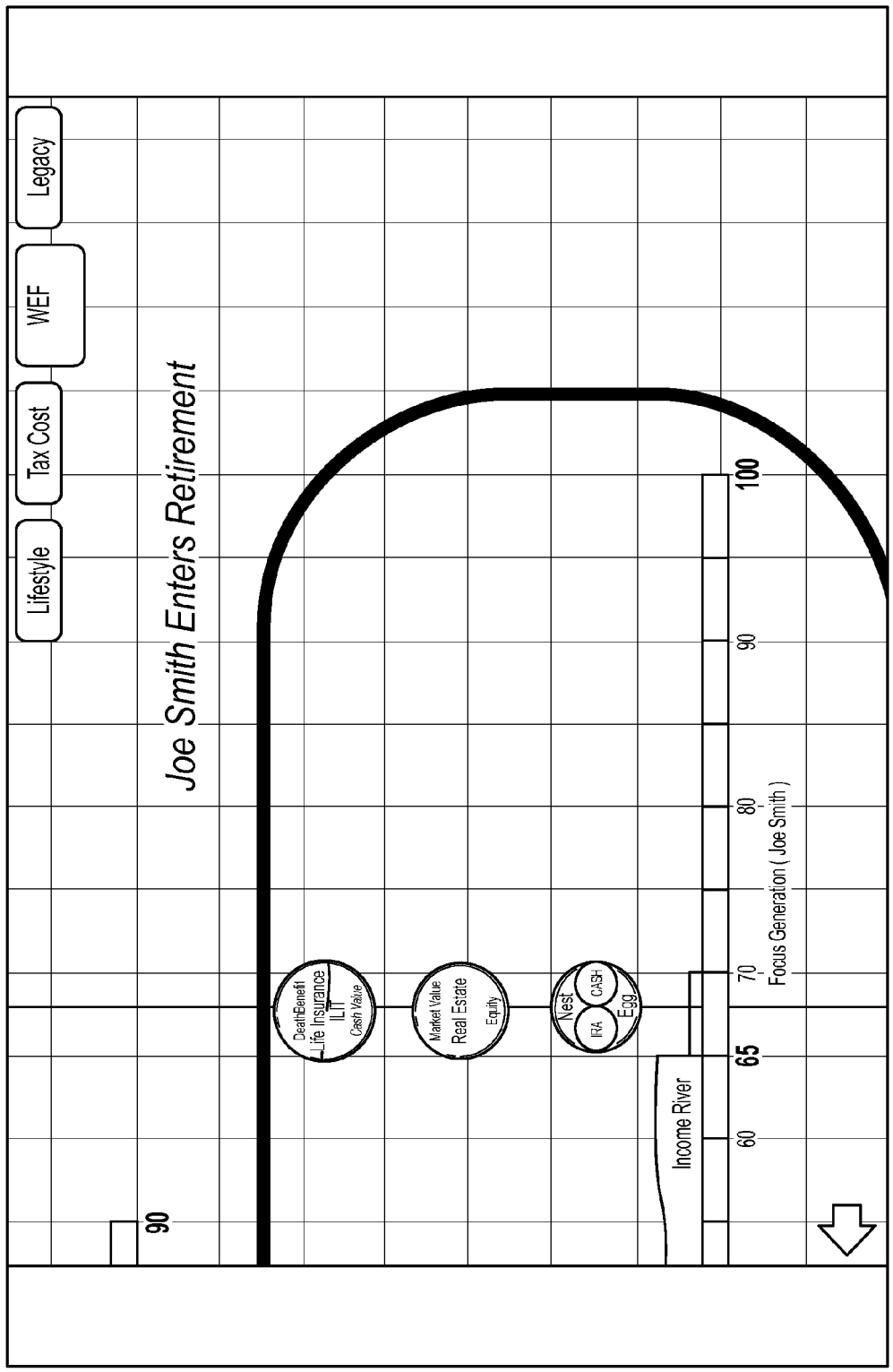

FIG. 22 shows the user at about age 62, when the user pays off his mortgage and stops contributing to his life insurance and nest egg accounts. FIG. 23 shows the user closer to retirement and the end of the Income River. FIG. 24 shows the event of the user entering retirement and using his Nest Egg for retirement income (see item 8 of FIG. 11).

Figure 25:
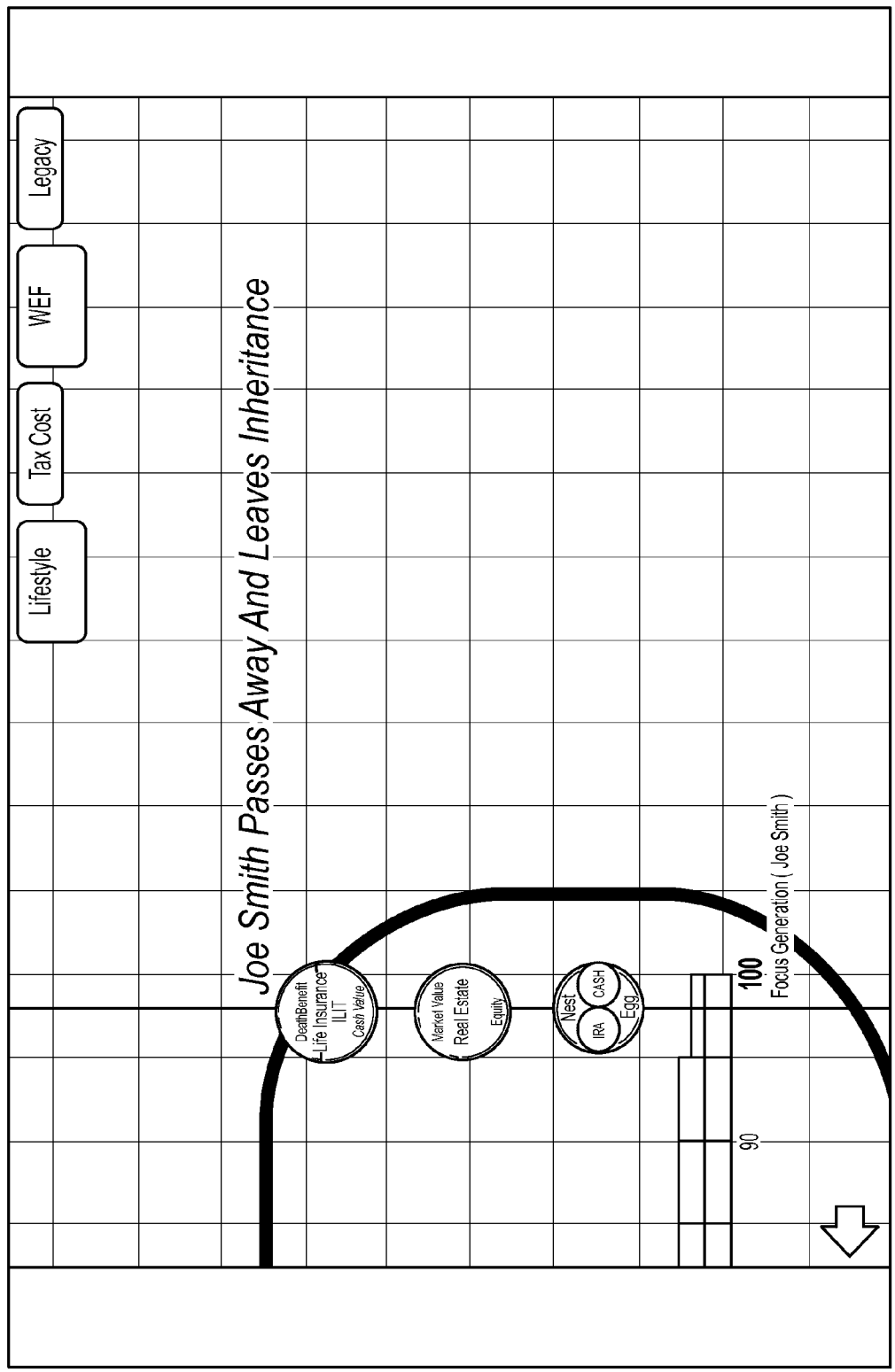
Figure 26:
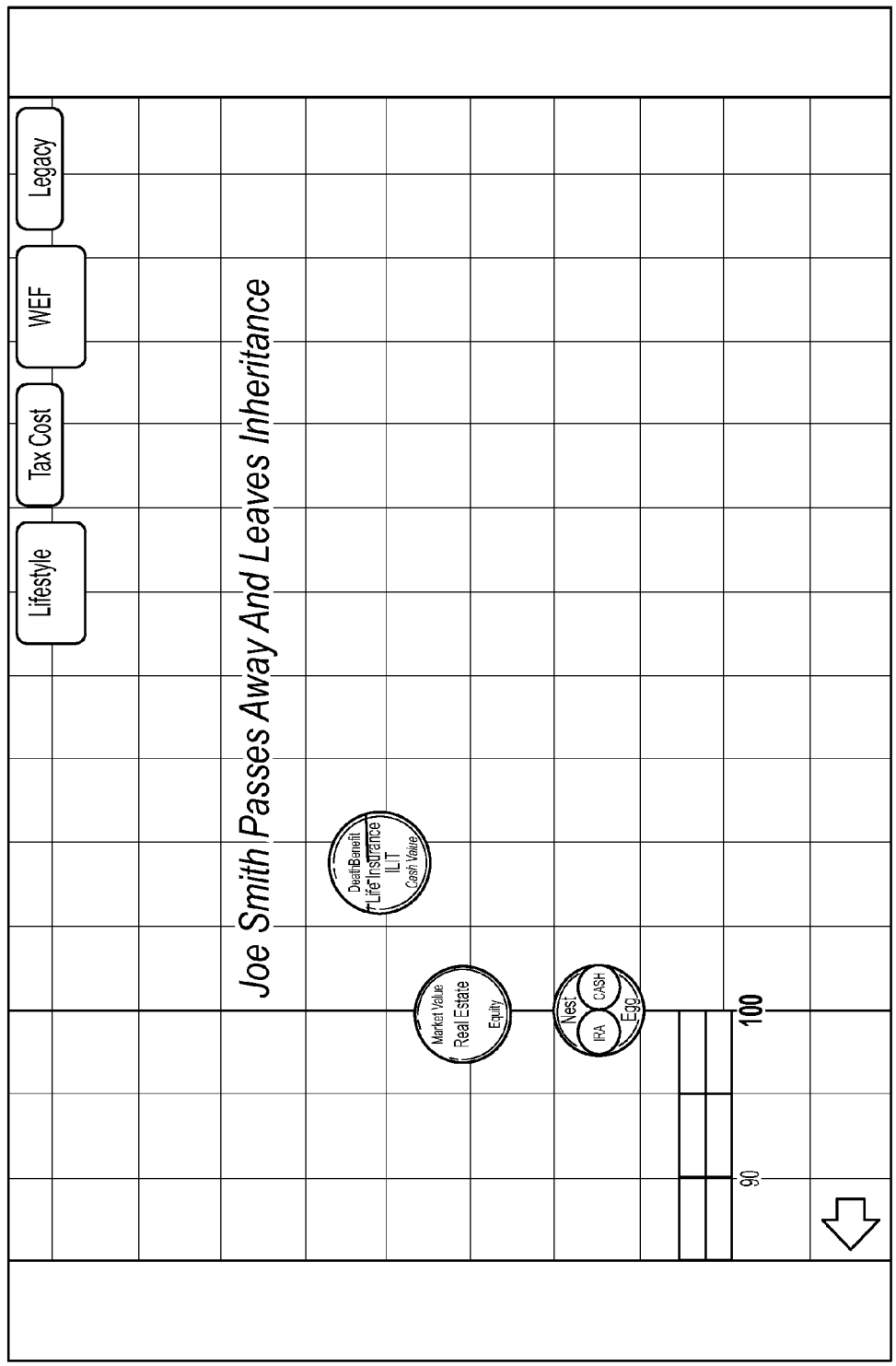
Figure 27:
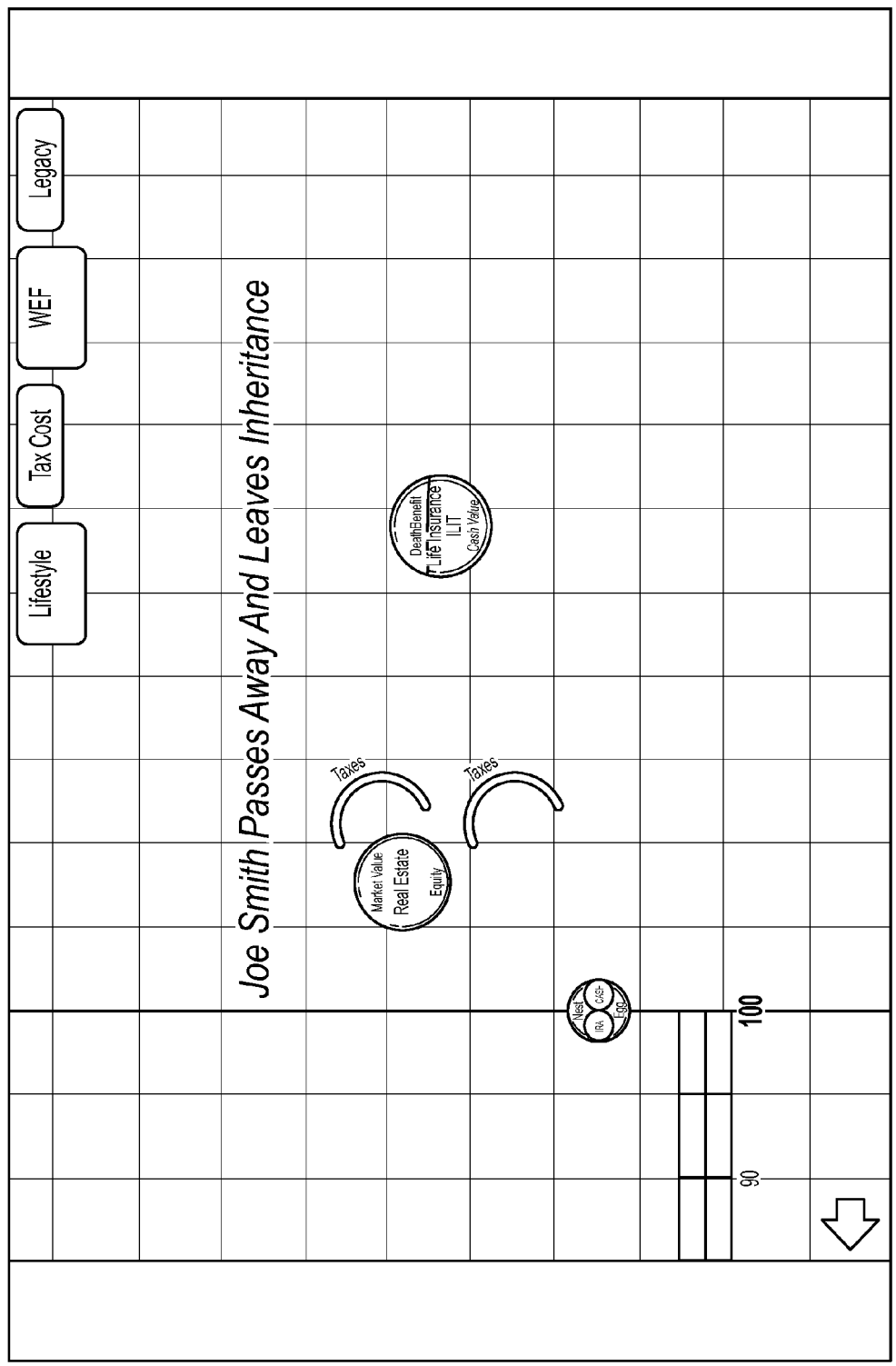
Figure 28:
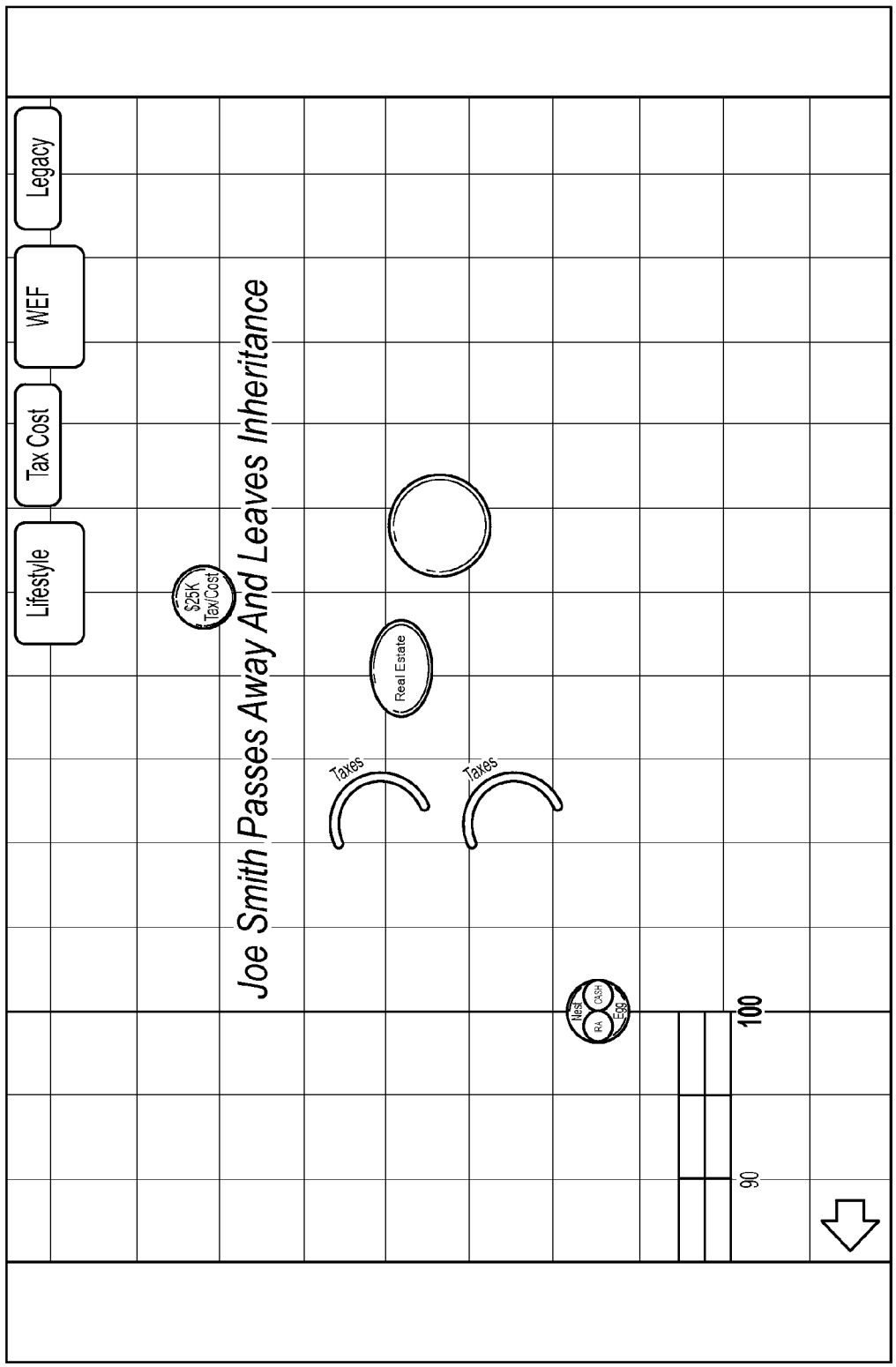
Figure 29:
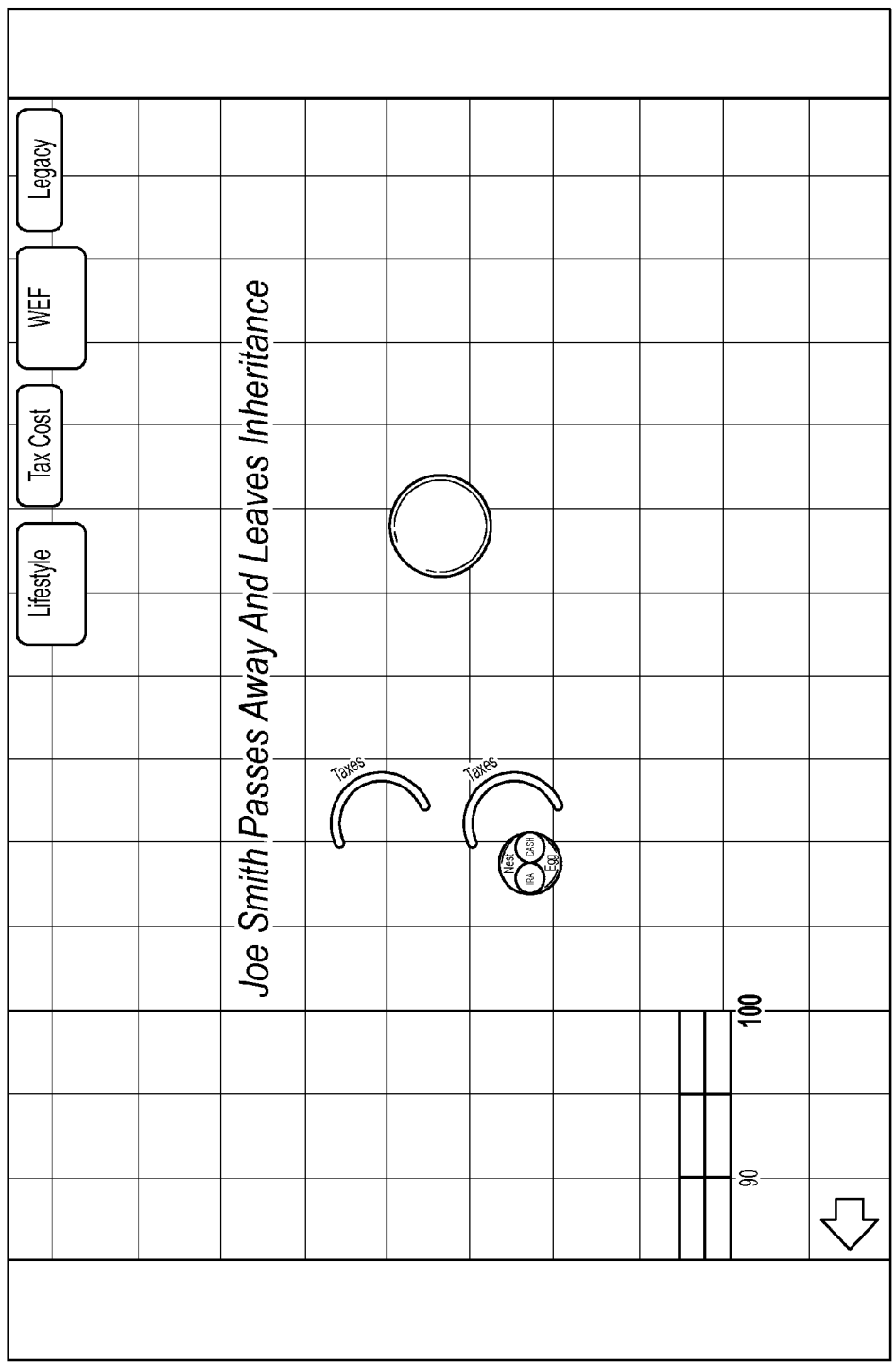
Figure 30:
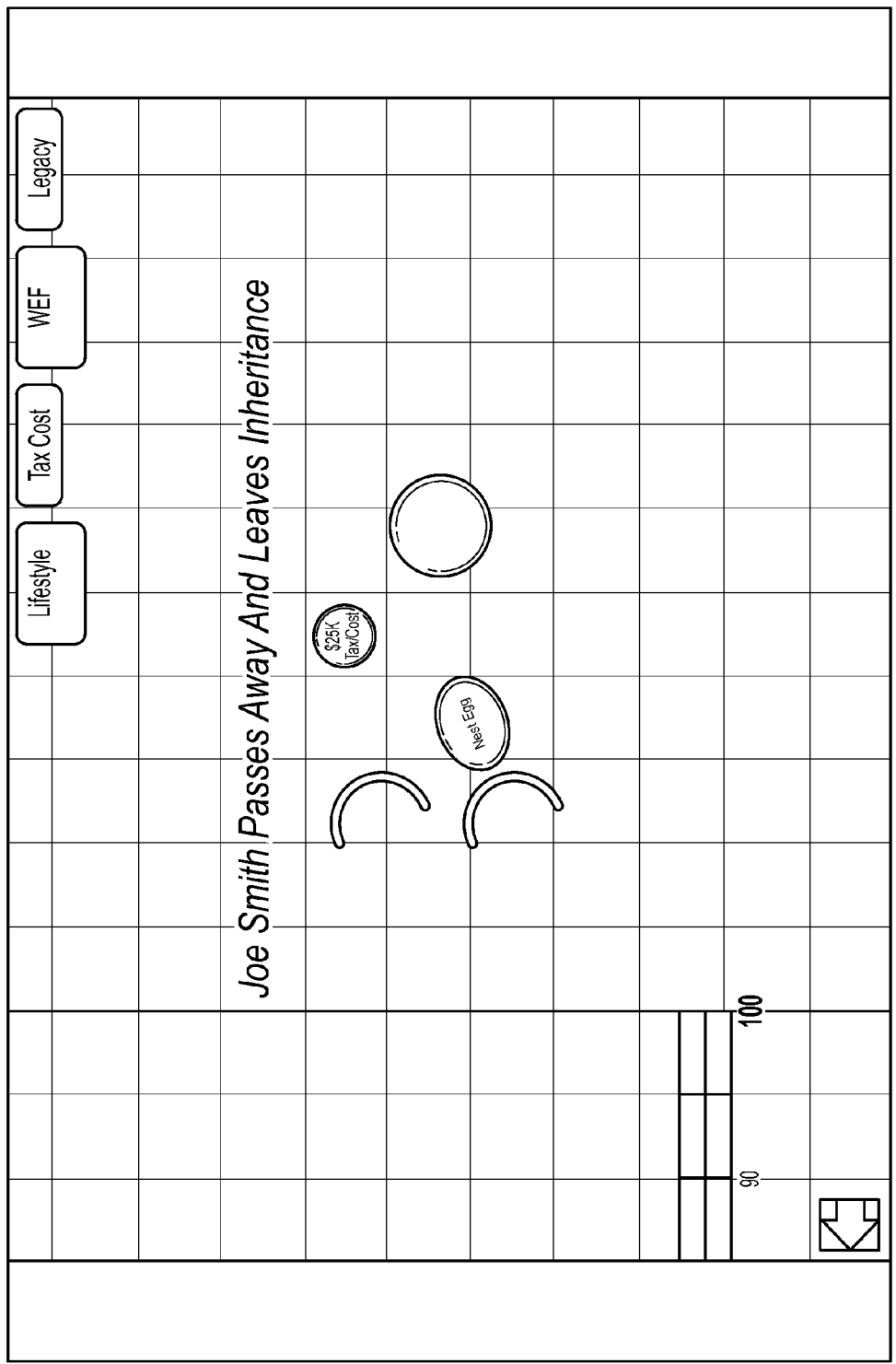
Figure 31:
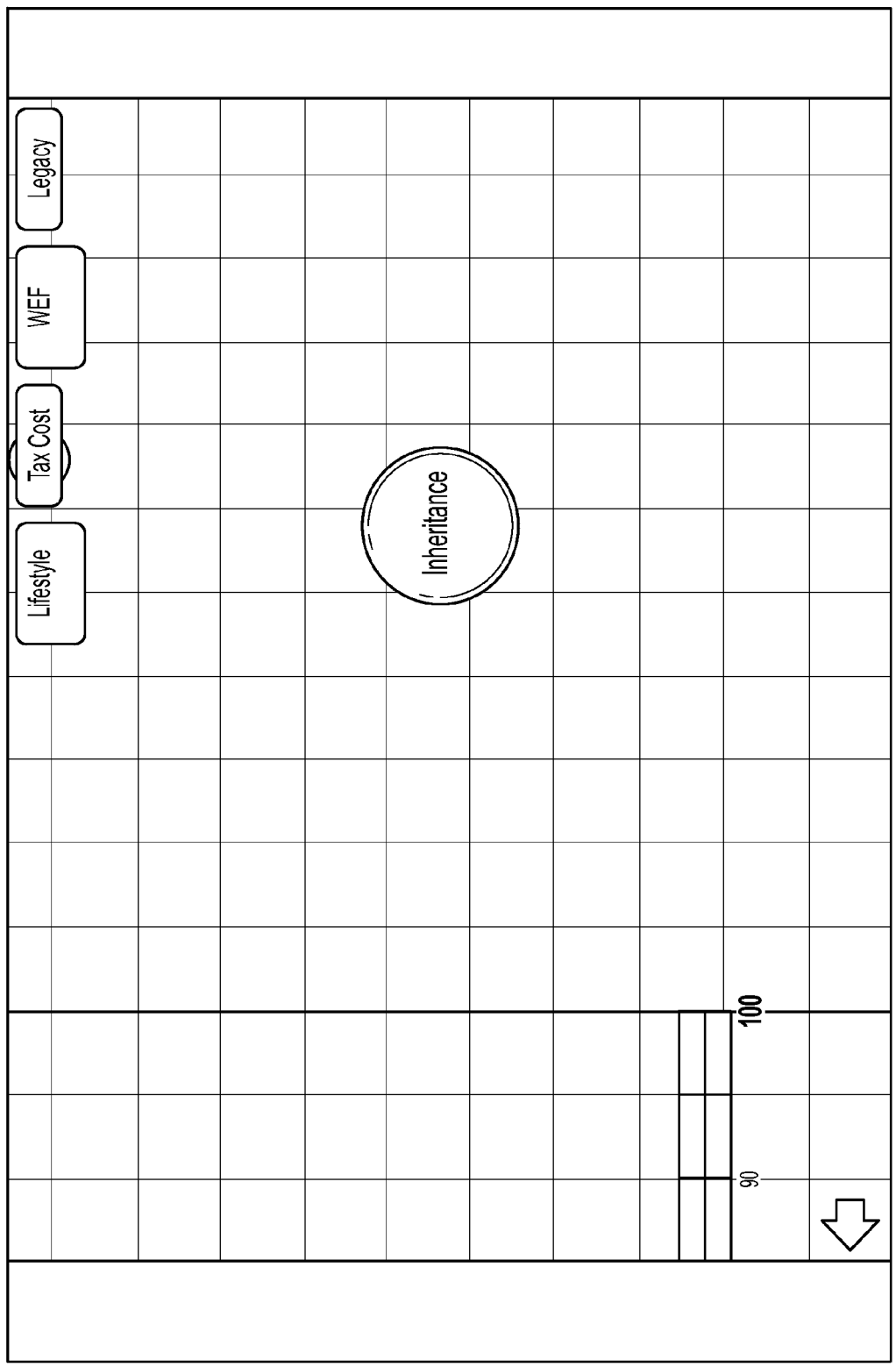
Figure 32:
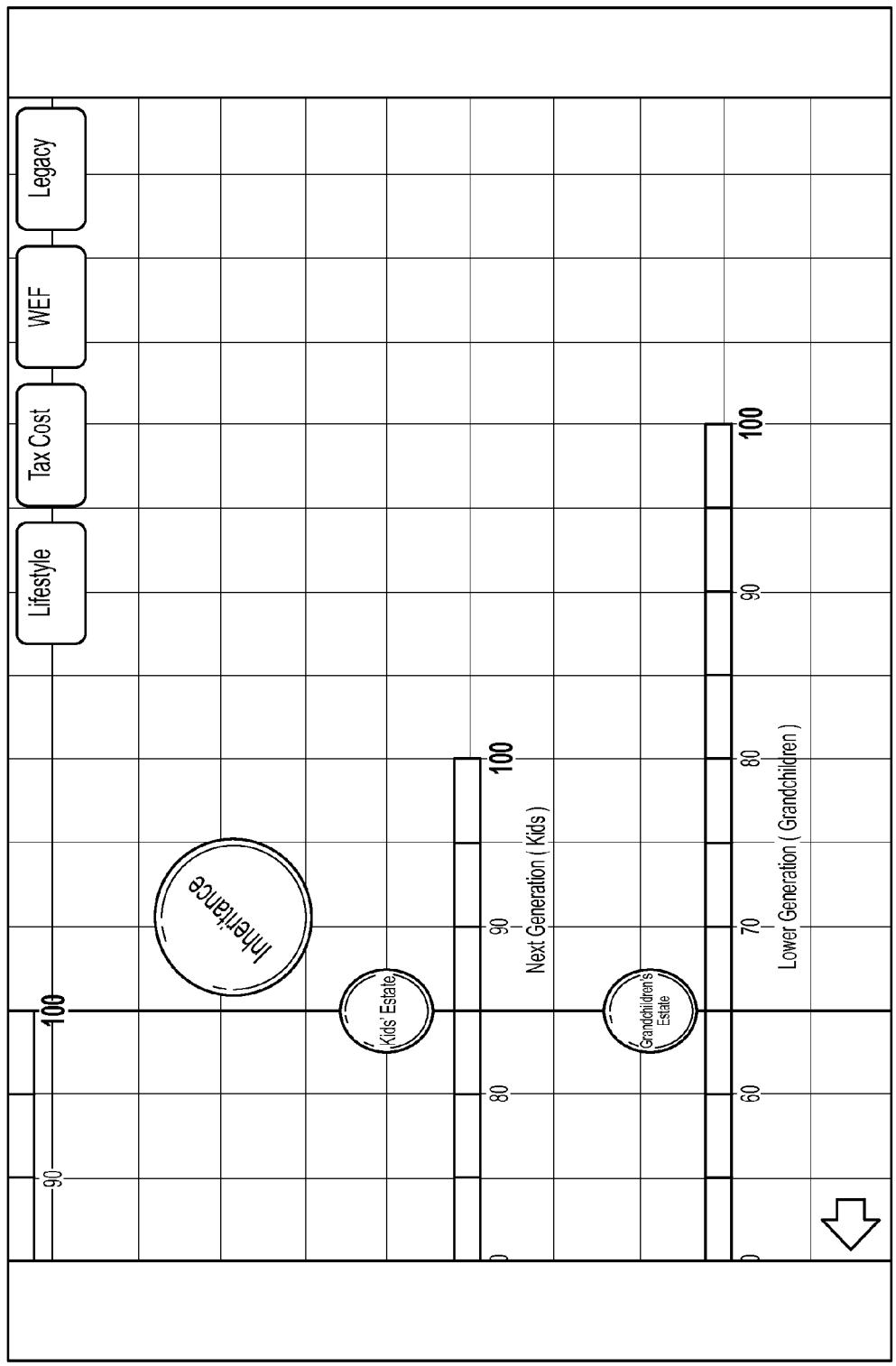
Figure 33:
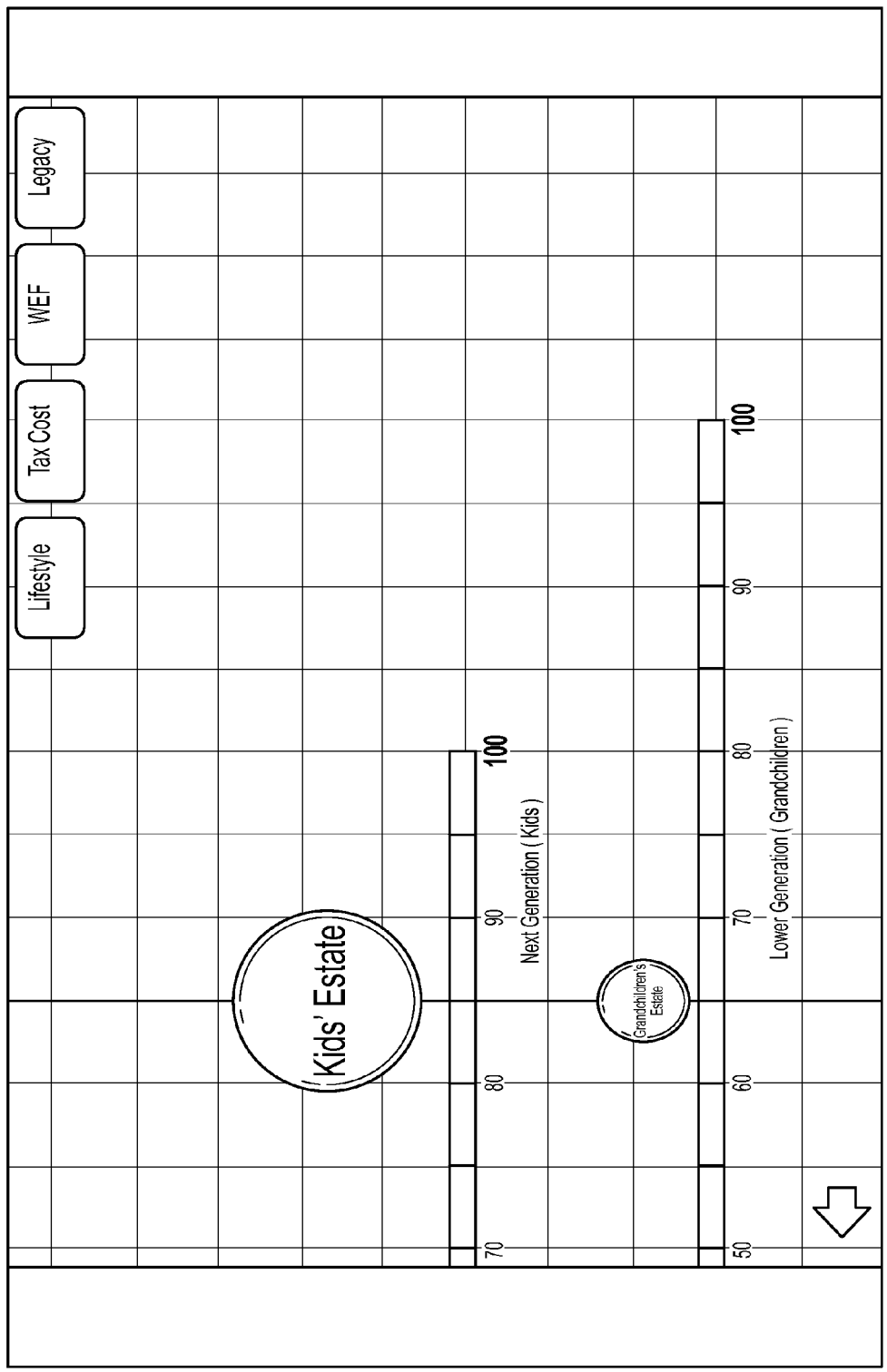

FIGS. 25-33 show the event of the user passing away, and leaving his assets to his kids (Next Generation) (see item 9 of FIG. 11). In FIG. 25, the Life Insurance is passing through the Traveling Wealth Protection Membrane. In FIG. 26, the Life Insurance is outside the Traveling Wealth Protection Membrane. In FIG. 27, taxes impact the Real Estate portion of the user's estate. FIG. 28 shows the assets, e.g., tax cost and the remaining Real Estate, after taxes. FIG. 29 shows the tax impact of the user's Nest Egg. FIG. 30 shows the assets, e.g., tax cost and Nest Egg, remaining after taxes. FIG. 31 shows the inheritance. FIG. 32 shows the Inheritance with respect to the Next Generation (Kids' Estate). FIG. 33 shows the Inheritance combined with the Kids' Estate.

The following User Flow & Process Models provide, in detail, the various data paths involved in the CiFiCo application. Specific models are developed for individual user types to identify decision points, data entry opportunities, and other various aspects of the application. The information included below only identifies the top-level abilities of each user type and does not get into application- or screen-specific functions.

Figure 3:
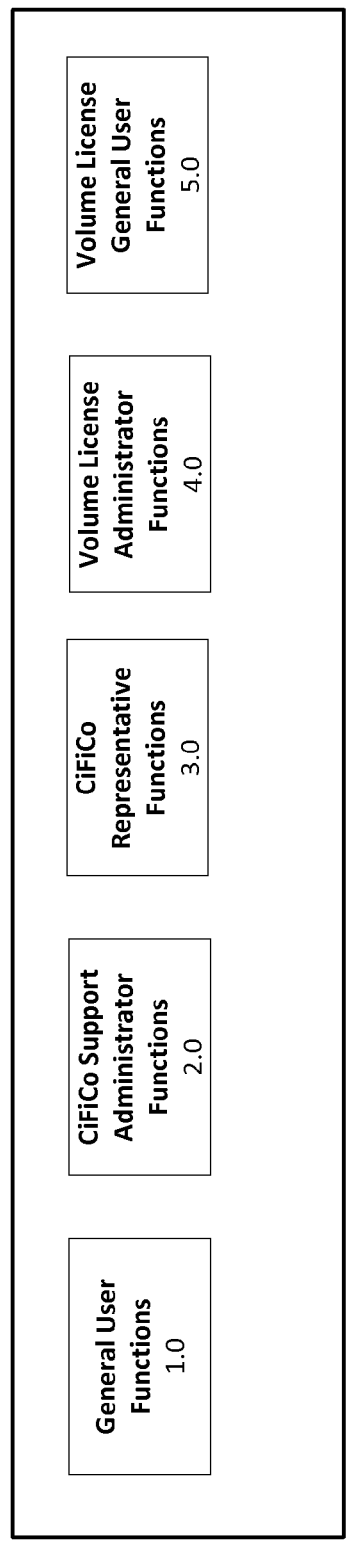
FIG. 3 illustrates five exemplary user types.
Figure 4:
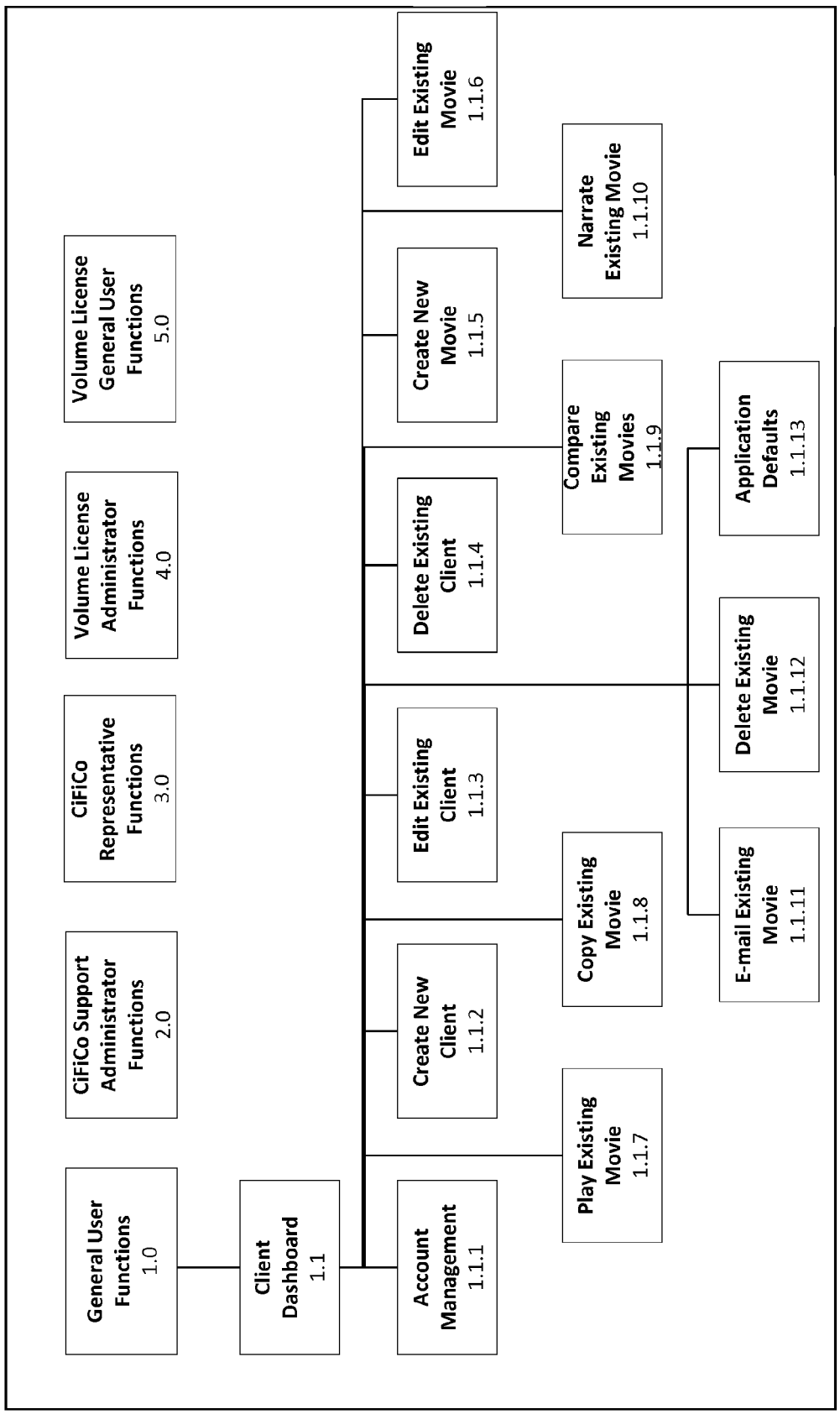
FIG. 4 illustrates default capabilities available to all users (e.g., General Users).
Figure 5:
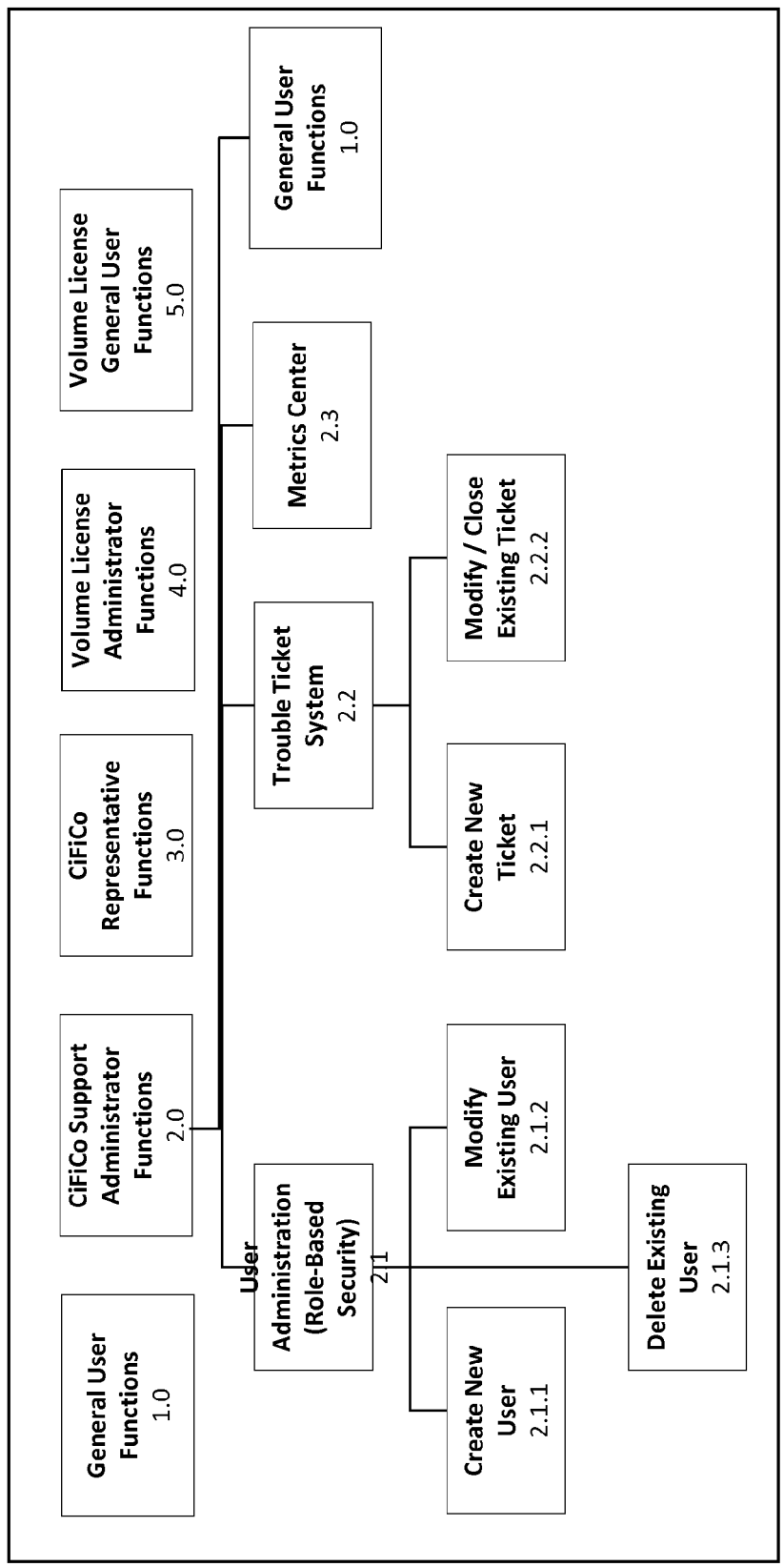
FIG. 5 shows the functional areas to which CiFiCo Support Administrators will have access.
Figure 6:
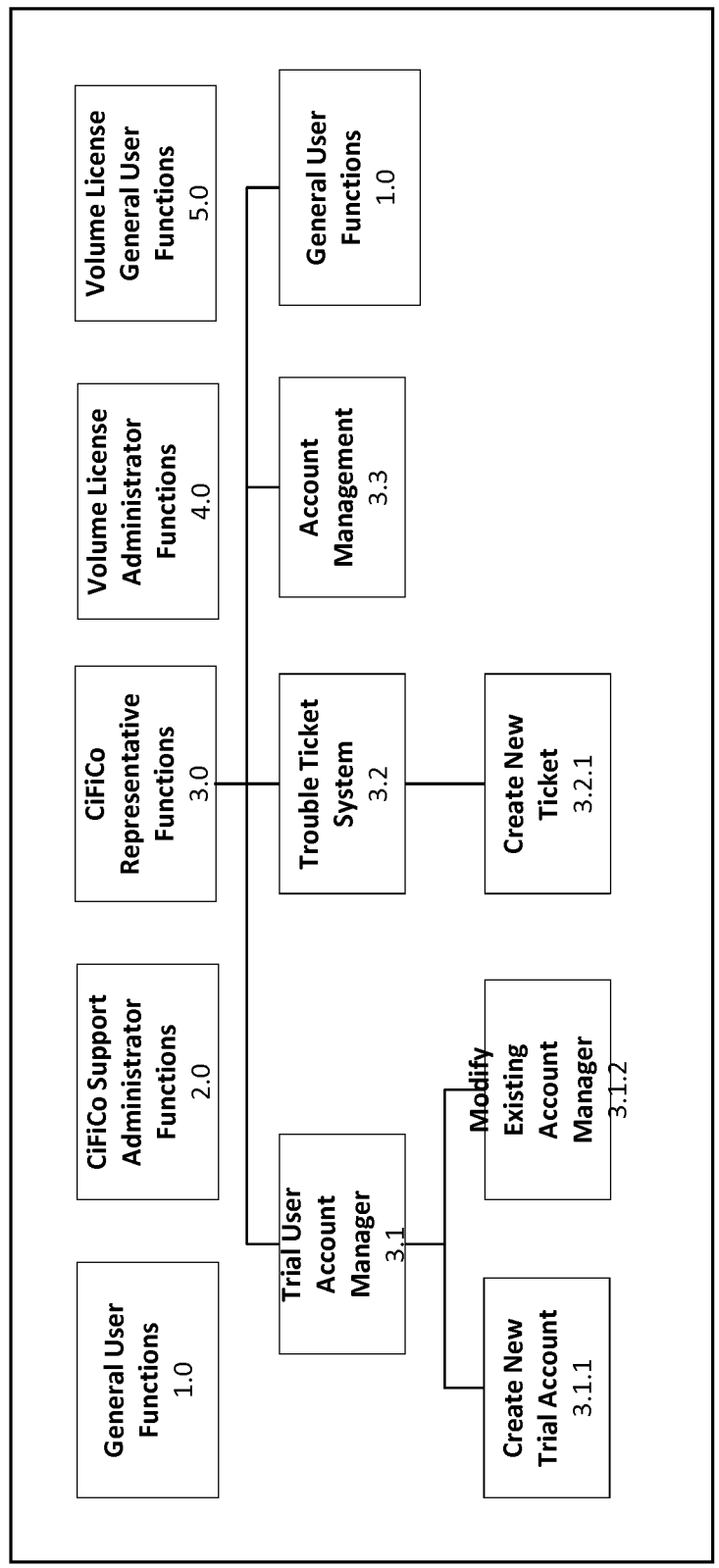
FIG. 6 shows the functional areas to which CiFiCo Representatives (e.g. sales agents) will have access.
Figure 7:
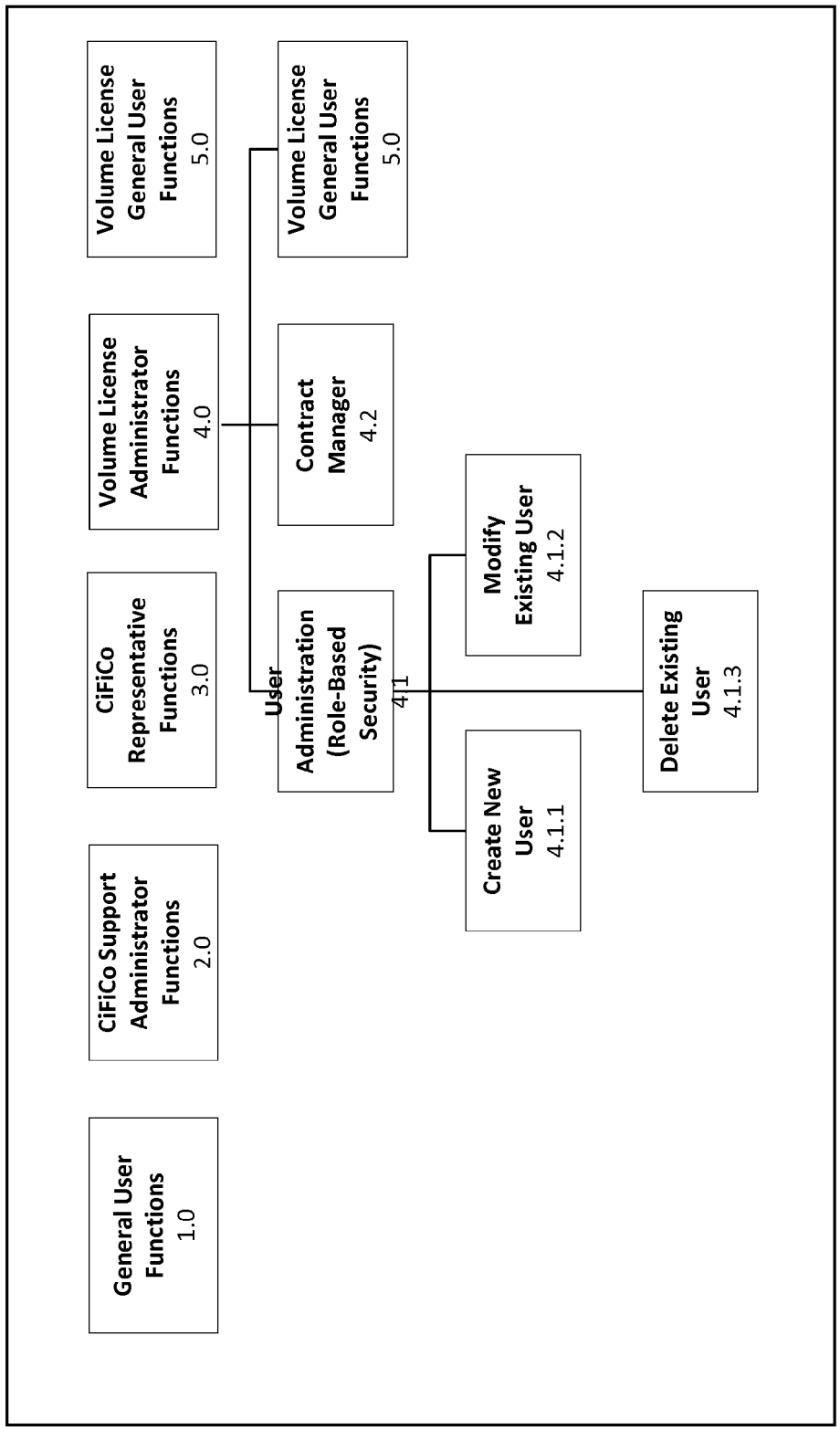
FIG. 7 shows the functional areas to which Volume License Administrators will have access.
Figure 8:
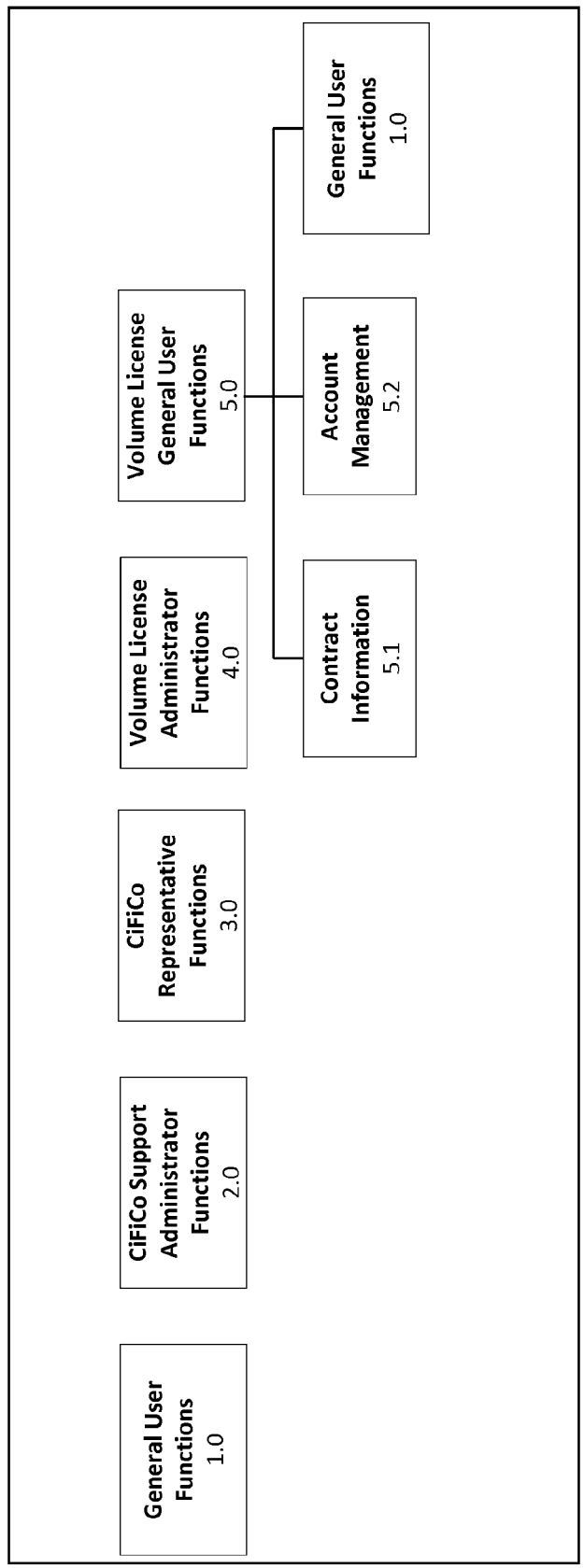
FIG. 8 shows the functional areas to which Volume License General Users will have access.

As shown in FIG. 3, in one embodiment, the application accommodates the following five (5) specific user types:
General Users
CiFiCo Support Administrators
CiFiCo Representatives
Volume License Administrators
Volume License General Users FIG. 4 illustrates default abilities that all users (e.g., General Users) will have. FIG. 5 shows the functional areas to which CiFiCo Support Administrators will have access. FIG. 6 shows the functional areas to which CiFiCo Representatives (e.g. sales agents) will have access. FIG. 7 shows the functional areas to which Volume License Administrators will have access. FIG. 8 shows the functional areas to which Volume License General Users will have access.

The CiFiCo user base consists of four (4) distinct user types. The four (4) distinct user types include: (a) Beginning User; (b) Basic User; (c) Advanced User; (d) Super User.

It is assumed that users will progress through the user ranks (starting with Beginning User and advancing to Super User) as their comfort level increases. A direct correlation can be made between a user's comfort level and the total number of movies they have created—the more movies a user creates, the more comfortable they are with the application; the more comfortable they are with the application, the more they are willing to "experiment" with additional application variables and actions. The overall level of comfort is assumed to follow the schedule below:

Beginning User—1-3 movies created
Basic User—4-10 movies created
Advanced User—11-20 movies created
Super User—more than 20 movies created Finally, it is also assumed that most users will remain in the Beginning User/Basic User category, regardless of the total number of movies they have created or their overall comfort level with the application. This is because we assume 85-90% of all users will always look for the easiest and most direct way to create a client movie; entering the minimum amount of data necessary to produce an effective movie—one in which they can open or further a dialog between themselves and their client.

Beginning User: Beginning Users will usually use the basic functions of the application and often stay to the predefined user path set by the application to enter different variables, rarely straying from the required elements necessary to produce their first few movies. These users will probably not enter more than one (1) or two (2) 'Prior' or 'Next' generation members. They are mostly just testing out the functionality of the application and trying to determine their level commitment to CiFiCo and whether or not they will incorporate it into their day-to-day operations. These users will rarely edit or create a new movie in front of a client and may require help and/or assistance from time-to-time. The Beginning User may try one (1) or two (2) WEFs, but will not experiment beyond the common types. These users typically will spend no more than 5-7 minutes on a single movie.

Basic User: Basic Users are those users who have developed a few movies and have an understanding of the steps necessary to create a client movie, but do not fully understand all of subtle nuances of the application. These users are starting to experiment with editing existing movies and adding multiple 'Prior', 'Next', and 'Lower' generation members, but are not tapped into the application's full potential. These users will also experiment with different types of Nest Egg Accounts, but don't fully understand the power of a Miscellaneous Account or the full capabilities of the 'Master Ins & Outs'. The Basic User may insert a few different WEFs, but will typically leave them to the most common types. The user may attempt to edit a movie in front of a client, but do so with limited success. These users will spend an average of 5-10 minutes preparing a single movie.

Advanced User: Advanced Users have created multiple movies, edited a few existing ones, and may have experimented with duplicating techniques. The Advanced User understands the various controls found throughout the application and has found success in following our pre-defined user path as well as his or her own actions, but has not yet tapped into the power of the Narrate function, or the subtle controls found throughout the application, including the Volatility Meter, color modifications on the movie player, zoom and selective zoom controls, and other user preferences. The Advanced User will begin to use some of the advanced controls, included Amortization Tables, Table Entries, and Reverse Mortgage Calculators, but has not yet mastered them. Advanced Users will typically find it easy to create a movie in under 2 minutes. Generally, these users will spend an average of 5-10 minutes preparing a movie and another 5 minutes tweaking various aspects on a final playback. Advanced Users can also begin to experiment with the Narrate controls and spend time editing existing movies with this "new" feature.

Super User: The Super User has mastered the various controls, inputs, and preferences the application offers to create a movie and edit or narrate an existing movie. The user will have full understanding of the cause-and-effect relationships between various input controls found throughout the application and begin to make conscious decisions ahead of time, before they place them into the application. These users have started to use some of the advanced controls, included Amortization Tables, Table Entries, and Reverse Mortgage Calculators, but have not defined their own application and/or movie defaults. Super Users will find it easy to create a movie in under 2 minutes. These users will spend an average of 5 minutes setting their application and/or movie defaults, 5-10 minutes preparing a movie and another 5-10 minutes tweaking various aspects on a final playback.

Figure 9:
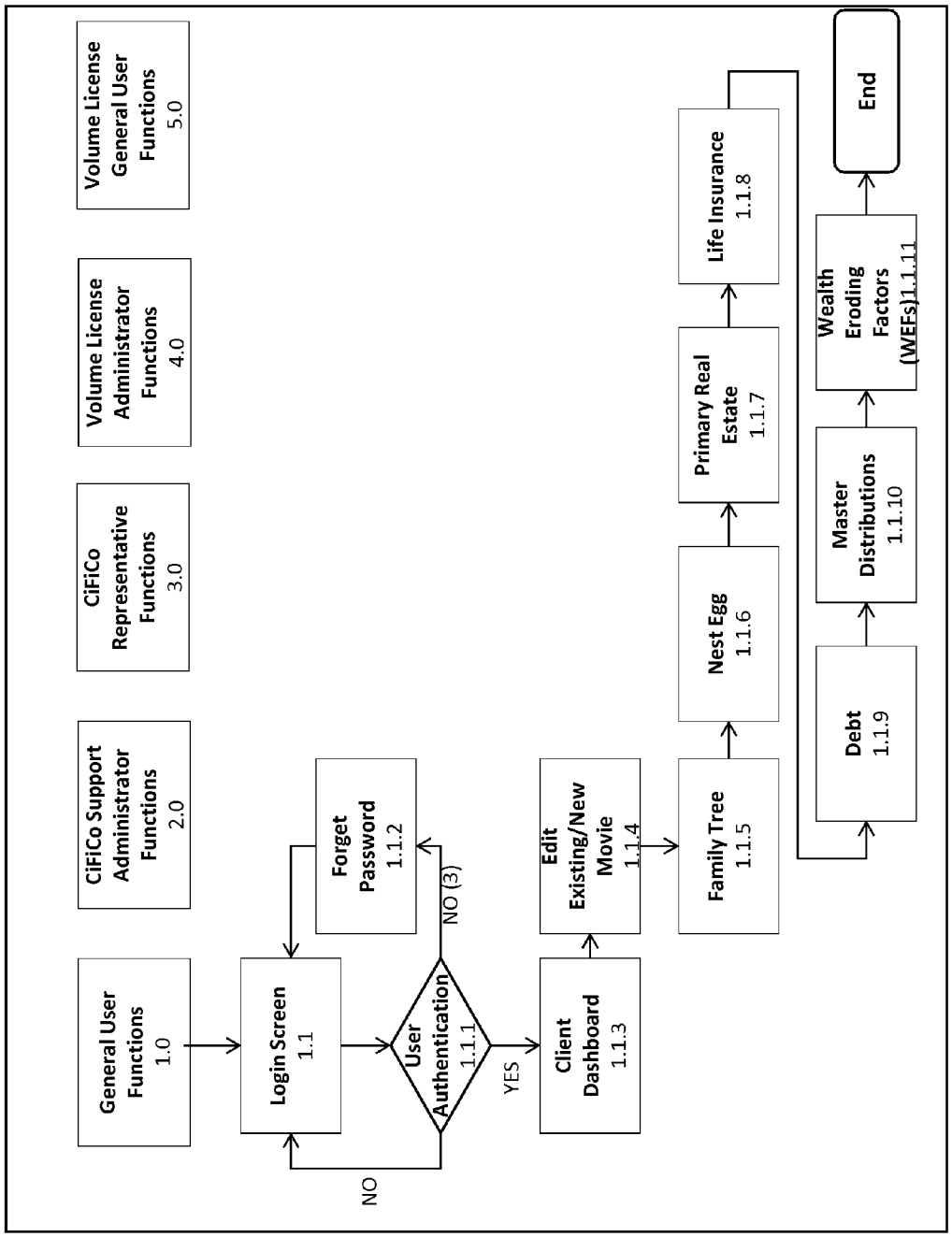
FIG. 9 is a flow diagram illustrating an exemplary predefined user path that a user may follow.

FIG. 9 is a flow diagram illustrating an example pre-defined user path that a user may follow. All user types, with the exception of administrative users, will be required to follow one of several pre-defined user paths, as shown in FIG. 9.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method of presenting resource information for an entity, comprising:
receiving input data associated with the resource information of the entity;
generating, by a computer, an animated representation of the resource information along one or more determined timelines employing a plurality of graphical characters based on the input data; and
displaying the animated representation,
wherein the animated representation comprises a movie of interactions among the plurality of graphical characters to represent changes in attributes of the resource information caused by the interactions,
wherein the graphical characters represent the resource information, and the graphical characters changing comprises the graphical characters expanding, contracting, exploding, melting into one another, dividing, changing texture, changing permeability, or changing color, or combinations thereof, to represent changes in the resource information over time, and
wherein the graphical characters further comprise a visual membrane representing tax that the graphical characters that represent the resource information pass through at a specified time.

2. The method of claim 1, wherein the one or more timelines comprises a timeline that represents the entity's lifespan.

3. The method of claim 1, wherein the one or more timelines further comprises a generational timeline representing a lifespan of earlier or later generation to the entity's lifespan.

4. The method of claim 1, wherein the graphical characters further comprise a meridian line that travels through the center of the graphical characters that represent the resource information, and wherein the meridian line together with the graphical characters that represent the resource information move along the timeline to represent passage of time.

5. The method of claim 1, wherein the graphical characters further comprise a barrier membrane that represents how well protected the graphical characters that represent the resource information are from a wealth eroding factor attack, a level of protection represented graphically by a degree of thickness of the barrier membrane.

6. The method of claim 1, wherein the graphical characters further comprise an income river and a feeder tube connecting the income river to the graphical characters that represent the resource information, to animate resource flow.

7. The method of claim 1, wherein the graphical characters that represent the resource information further contain sub-characters to represent different types of the resource information.

8. The method of claim 1, wherein the graphical characters that represent the resource information further contain a visual representation associated with secondary value of a corresponding resource.

9. The method of claim 1, wherein the graphical characters further comprise visual tax bubble characters that represent taxes and visual money bubble characters that represent sums of money.

10. The method of claim 1, wherein the graphical characters further comprise one or more pools that represent respective one or more sums of values.

11. The method of claim 1, further including:
providing a movie control panel to enable controlling the displaying of the animated representation, including pausing, rewinding, fast-forwarding, zooming-in and zooming-out.

12. The method of claim 1, wherein the animated representation demonstrates an impact associated with asset accumulation, distribution, taxes, insurance, investments, or intergenerational transfers, or combinations thereof over a specified period of time.

13. The method of claim 1, wherein the resource information is financial information and the graphical characters represent assets and liabilities associated with the financial information.

14. A method of presenting resource information for an entity, comprising:
receiving input data associated with the resource information of the entity;
generating, by a computer, an animated representation of the resource information along one or more determined timelines employing a plurality of graphical characters based on the input data; and
displaying the animated representation,
wherein the animated representation comprises a movie of interactions among the plurality of graphical characters to represent changes in attributes of the resource information caused by the interactions,
wherein the graphical characters represent the resource information, and the graphical characters changing comprises the graphical characters expanding, contracting, exploding, melting into one another, dividing, changing texture, changing permeability, or changing color, or combinations thereof, to represent changes in the resource information over time, and
wherein the graphical characters further comprise a traveling membrane that appears or disappears according to its defensive quality to a wealth eroding factor attack.

15. A method of presenting resource information for an entity, comprising:
receiving input data associated with the resource information of the entity;
generating, by a computer, an animated representation of the resource information along one or more determined timelines employing a plurality of graphical characters based on the input data; and
displaying the animated representation,
wherein the animated representation comprises a movie of interactions among the plurality of graphical characters to represent changes in attributes of the resource information caused by the interactions,
wherein the graphical characters represent the resource information, and the graphical characters changing comprises the graphical characters expanding, contracting, exploding, melting into one another, dividing, changing texture, changing permeability, or changing color, or combinations thereof, to represent changes in the resource information over time, and wherein the graphical characters further comprise a character representing a wealth eroding factor, the character representing the wealth eroding factor animated to attack the graphical characters that represent the resource information.

16. The method of claim 15, wherein the graphical characters further comprise a drain tube connecting the character representing the wealth eroding factor and one or more of the graphical characters that represent the resource information, to animate draining of a resource.

17. A computer storage medium comprising computer instructions for performing a method of presenting resource information for an entity, the method comprising:

receiving input data associated with the resource information of the entity;

generating, by a computer, an animated representation of the resource information along one or more determined timelines employing a plurality of graphical characters based on the input data; and displaying the animated representation, wherein the animated representation comprises a movie of interactions among the plurality of graphical characters to represent changes in attributes of the resource information caused by the interactions, wherein the graphical characters represent the resource information, and the graphical characters changing comprises the graphical characters expanding, contracting, exploding, melting into one another, dividing, changing texture, changing permeability, or changing color, or combinations thereof, to represent changes in the resource information over time, and wherein the graphical characters further comprise a traveling membrane that appears or disappears according to its defensive quality to a wealth eroding factor attack.

18. The computer storage medium of claim 17, wherein the generating comprises generating moving images of the plurality of graphical characters changing and interacting to represent changes in the resource information.

19. A system for presenting resource information of an entity, comprising:

a processor;

a module operable to execute on the processor and further operable to receive input data associated with the resource information of the entity, the module further operable to generate an animated representation of the resource information along one or more determined timelines employing a plurality of graphical characters based on the input data, the module further operable to display the animated representation, wherein the animated representation comprises a movie of interactions among the plurality of graphical characters to represent changes in attributes of the resource information caused by the interactions, wherein the graphical characters represent the resource information, and the graphical characters changing comprises the graphical characters expanding, contracting, exploding, melting into one another, dividing, changing texture, changing permeability, or changing color, or combinations thereof, to represent changes in the resource information over time, and wherein the graphical characters further comprise a traveling membrane that appears or disappears according to its defensive quality to a wealth eroding factor attack.

* * * * *